US00RE50552E

(19) United States
(12) Reissued Patent
Ardes

(10) Patent Number: US RE50,552 E
(45) Date of Reissued Patent: Aug. 26, 2025

(54) FILTER WITH A REPLACEABLE FILTER INSERT

(71) Applicant: HENGST SE, Münster (DE)

(72) Inventor: Wilhelm Ardes, Ascheberg (DE)

(73) Assignee: HENGST SE, Münster (DE)

(21) Appl. No.: 18/075,311

(22) Filed: Dec. 5, 2022

Related U.S. Patent Documents

Reissue of:
(64) Patent No.: 9,044,698
Issued: Jun. 2, 2015
Appl. No.: 13/882,638
PCT Filed: Oct. 31, 2011
PCT No.: PCT/EP2011/069146
§ 371 (c)(1),
(2) Date: Jun. 25, 2013
PCT Pub. No.: WO2012/059474
PCT Pub. Date: May 10, 2012

(30) Foreign Application Priority Data

Nov. 4, 2010 (DE) ..... 10 2010 043 433.7
Nov. 12, 2010 (DE) ..... 10 2010 043 836.7

(51) Int. Cl.

| | |
|---|---|
| ***B01D 35/147*** | (2006.01) |
| ***B01D 29/21*** | (2006.01) |
| ***B01D 29/96*** | (2006.01) |
| ***B01D 35/153*** | (2006.01) |
| ***B01D 35/16*** | (2006.01) |
| ***B01D 35/30*** | (2006.01) |
| ***B01D 46/00*** | (2022.01) |

(52) U.S. Cl.
CPC ..... *B01D 35/147* (2013.01); *B01D 29/21* (2013.01); *B01D 29/96* (2013.01); *B01D 35/153* (2013.01);
(Continued)

(58) Field of Classification Search
CPC ..... B01D 35/306; B01D 2201/305; B01D 2201/316; B01D 2201/34;
(Continued)

(56) References Cited

U.S. PATENT DOCUMENTS 5,660,729 A 8/1997 Baumann
6,554,139 B1 4/2003 Maxwell et al.
(Continued)

FOREIGN PATENT DOCUMENTS

DE 29915843 U1 1/2001
EP 1235624 5/2003
(Continued)

OTHER PUBLICATIONS

International Search Report dated Jan. 23, 2012; priority document. Search Report, Jan. 23, 2010.

*Primary Examiner* — Matthew J Kasztejna
(74) *Attorney, Agent, or Firm* — Greer, Burns & Crain, Ltd.

(57) ABSTRACT

A fluid filter with a housing, a releasable cover, and a replaceable filter having a filter body and two end discs. The filter is plugged onto a housing pipe and a locking ring is guided on the pipe, preloaded in a push-out direction. The locking ring is locked in a pushed-out position by a locking device. An unlocking device guided by the filter unlocks the locking device when the filter is pushed onto the pipe and enables the locking ring and the filter to be pushed in. When the filter is fitted into the housing, a seal on the end disc or locking ring interacts with a housing sealing surface to separate an untreated filter side from a clean side. When the locking ring is in the pushed-out position and the filter bears against the locking ring, the seal is held away from the sealing surface of the housing.

46 Claims, 26 Drawing Sheets

(52) U.S. Cl.
CPC ..... *B01D 35/16* (2013.01); *B01D 35/306* (2013.01); *B01D 46/0084* (2013.01); *B01D 46/0087* (2013.01); *B01D 2201/291* (2013.01); *B01D 2201/305* (2013.01); *B01D 2201/316* (2013.01); *B01D 2201/34* (2013.01); *B01D 2201/4007* (2013.01); *B01D 2201/4046* (2013.01); *B01D 2201/4084* (2013.01)

(58) Field of Classification Search
CPC .... B01D 2201/4007; B01D 2201/4046; B01D 2201/4053; B01D 2201/4084; B01D 29/96
See application file for complete search history.

(56) References Cited

U.S. PATENT DOCUMENTS

| | | | | |
|---|---|---|---|---|
| 6,797,168 | B1 * | 9/2004 | Knight | 210/497.01 |
| 8,002,981 | B2 | 8/2011 | Bagci et al. | |
| 8,123,831 | B2 * | 2/2012 | Heikamp | 55/498 |
| 9,776,116 | B2 | 10/2017 | Honermann | |
| 2006/0219621 | A1 | 10/2006 | Dworatzek | |
| 2007/0000830 | A1 | 1/2007 | Snider et al. | |
| 2008/0053886 | A1 | 3/2008 | Marshall et al. | |
| 2008/0245719 | A1 | 10/2008 | Beard et al. | |
| 2009/0230048 | A1 | 9/2009 | Braunheim | |
| 2010/0044295 | A1 | 2/2010 | Honermann et al. | |
| 2013/0232929 | A1 * | 9/2013 | Thomas et al. | 55/428 |
| 2014/0215982 | A1 * | 8/2014 | Wood et al. | 55/502 |
| 2016/0271533 | A1 | 9/2016 | Honermann | |

FOREIGN PATENT DOCUMENTS

| | | | |
|---|---|---|---|
| EP | 1235624 | B1 | 5/2003 |
| JP | 2004136203 | A | 5/2004 |
| WO | 2010123344 | | 10/2010 |
| WO | 2010123344 | A1 | 10/2010 |

* cited by examiner

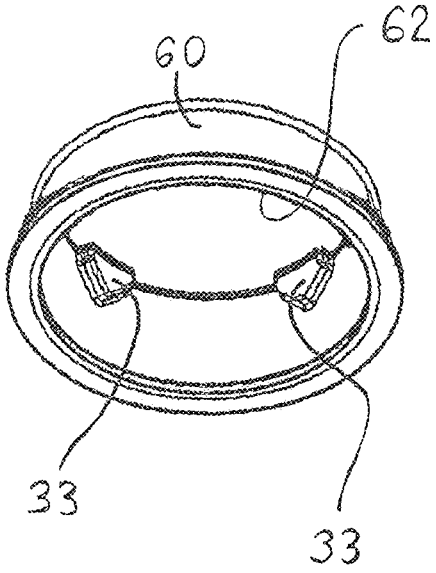
Fig. 27
NEW

FILTER WITH A REPLACEABLE FILTER INSERT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFRENCES TO RELATED APPLICATIONS

This application claims the benefit of the German patent application No. 110 2010 043 433.7 filed on Nov. 4, 2010 and the German patent application No. 10 2010 043 836.7 filed on Nov. 12, 2010, the entire disclosures of which are incorporated herein by way of reference.

BACKGROUND OF THE INVENTION

The instant invention relates to a filter for a fluid medium, in particular oil, water, fuel or air filter for an internal combustion engine, comprising a filter housing and a cover, which is releasably connectable to the latter, comprising a replaceable filter insert, which consists of a hollow-cylindrical filter cloth body and two end discs, enclosing the latter frontally, the one end disc of which encompasses a central through hole, wherein, leading with the open end dise, the filter insert can be plugged onto a central stand pipe, which forms part of the filter housing, wherein a locking ring is guided in an axially displaceable manner on the stand pipe, wherein the locking ring is preloaded by a force acting in a pushed-out direction pointing towards the free end of the stand pipe, wherein, in a pushed-out position, the locking ring is locked by a locking device against being pushed in, wherein provision is made for unlocking means, which are guided by the filter insert and which, when the filter insert is pushed onto the stand pipe, actuate the locking device in the unlocking direction and enable the locking ring and the filter insert to be pushed in, and wherein, when the filter insert is fitted into the filter housing, a seal provided on the end disc or on the locking ring interacts with a sealing surface of the filter housing to separate an untreated medium side from a clean medium side of the filter. The invention furthermore relates to a filter insert for use in the above-mentioned filter.

Increasingly higher demands are made on filters, in particular oil, water, fuel or air filters for an internal combustion engine, in particular in view of the filter refinement and the service life of the replaceable filter inserts. These high demands can only be fulfilled, when suitable high-quality filter inserts are fitted into the filters.

A filter, by means of which the installation of an unsuitable third-party filter insert within the context of a filter maintenance with a filter insert replacement is interrupted, is known from EP 1 235 624 B 1. This document describes a filter comprising the above-mentioned features. The locking ring, which is guided on the stand pipe, is also a valve sleeve, which can be displaced axially on the stand pipe and which is preloaded with a force, which acts in valve closing direction. In the closed position of the valve, the locking ring latches with the stand pipe by means of locking lugs, which face radially inward, on locking tabs. By attaching a filter insert by means of suitable unlocking means, the latching of the locking ring or of the valve sleeve, respectively, with the stand pipe, is released, in that the locking tabs are pivoted radially out- wardly. The locking ring is then displaced by means of the filter insert into valve open position and is held therein. An unsuitable third-party filter insert does not disengage the latching of the locking ring on the stand pipe and the filter insert cannot be attached completely onto the stand pipe. An operation of the filter is thus not possible, due to the valve body, which is in closed position; the same applies when a filter insert is missing. The locking ring is sealed against the stand pipe by means of a sealing ring. The end disc of the filter insert, which interacts with the locking ring, is sealed against the locking ring via a further sealing ring on the end disc.

Even though this known filter fulfills the demands of preventing the installation of an unsuitable third-party filter insert, a filter insert comprising an end disc comprising unlocking means, which are designed so as to be relatively extensive, is necessary for this purpose and two sealing locations, in each case comprising a sealing ring, are present, which is associated with an increased parts and assembly effort in a disadvantageous manner.

SUMMARY OF THE INVENTION

The instant invention thus has the object of creating a filter of the above-mentioned type, which makes it impossible to use unsuitable filter inserts and to operate the filter without a filter insert and which thereby encompasses a simple design comprising a small number of individual components and still comprising a high functional reliability.

According to the invention, the solution of the part of this object relating to the filter is possible by means of a filter of the above-mentioned type, which is characterized in that, in the case of a locking ring, which is in pushed-out direction and in the case of a filter insert, which is in axial contact with the locking ring, the seal is held at a distance from the corresponding sealing surface of the filter housing.

An advantageously simple design is attained by means of the invention, because only one seal is required in the filter between the filter insert and the filter housing; further seals are not required. The desired function, namely to prevent the operation of the filter with an unsuitable third-party filter insert, which does not encompass the required unlocking means, is also attained by means of only the single seal. This is attained in a particularly simple manner in that, when using a filter insert, which does not encompass the required unlocking means, the seal provided between said filter insert and the filter housing does not reach a sealing position at all; according to the invention, the seal is in this case instead held at a distance from the corresponding seal seat. At the same time, the filter insert cannot be brought into its fitted position, which prevents a closing of the filter housing by means of the corresponding housing cover. The desired function is thus reached in a highly reliable manner and with cost-efficient production and assembly costs by means of technically simple means.

In a further embodiment, provision is preferably made for the filter housing to have a bottom comprising a central, hollow-cylindrical bottom part and for the sealing surface on the filter housing side to be arranged on an inner peripheral surface or outer peripheral surface or end surface of the hollow-cylindrical bottom part. In the case of this embodiment, a seal comprising a relatively small diameter is sufficient in an advantageous manner, which contributes to cost-efficient production costs. The seal can be embodied so as to seal radially or so as to seal axially, wherein a radially sealing seal is preferred, because a compensation of dimensional tolerances is simpler by means of it.

In terms of a compact design, it is proposed for the hollow-cylindrical bottom part and a lower part of the stand pipe to define an annular gap, which accommodates the locking ring in the pushed-in position thereof at least across a part of its height.

Provision is furthermore made in an advantageous manner for the end disc of the filter insert, which encompasses the through hole, to encompass a central annular appendage, which surrounds the through hole, on its side, which faces away from the filter cloth body, and which supports the seal. Due to the fact that the seal is assigned to the filter insert, the seal is renewed with each filter insert replacement during maintenance of the filter, which contributes to a reliable function.

A further development concerning this matter proposes for the appendage to engage with the annular gap by means of the seal when the filter housing is fitted in the filter housing. An advantageous arrangement and accommodation of the seal is possible in this embodiment.

In the case of the filter according to the invention, the unlocking means can be arranged or integrally molded on the filter insert or on a separate unlocking means body, which can be plugged onto the stand pipe before the filter insert. In the first alternative, a particularly small amount of component parts are required. In the case of the second alternative, one extra component is present due to the separate unlocking means body, but this provides for a larger freedom when connecting filter inserts, because the latter then do not need to encompass the unlocking means, but only guide and position the unlocking means body in response to the installation of the filter insert into the filter housing.

However, provision is preferably made for the unlocking means to be arranged or integrally molded on the end disc of the filter insert, which encompasses the through hole, or on a support body, which forms part of the filter insert and which is arranged in the interior of the filter cloth body between the end discs. Parts of the filter insert, which are present in any event, are thereby used for arranging the unlocking means, which is advantageous from a technical point of view. The support body can be a hollow-cylindrical support grid, for example.

The above-mentioned locking device of the filter can be designed in different ways. A first embodiment to this effect provides for the locking device to be formed by means of locking guides, which are embodied so as to be integrally molded with or fixedly connected to the stand pipe, being movable in radial direction, in each case comprising a locking surface, which is oriented in axial direction, for the locking guides to be prestressed with a force, which acts in locking direction and, in each case lock the locking ring in its pushed- out position against an axial insertion relative to the stand pipe by means of its locking surface and for the locking guides to be directly movable in radial direction into the unlocked position thereof by means of the unlocking means when the filter insert is plugged onto the stand pipe. Due to the fact that the locking guides, which form the locking device, are embodied so as to be integrally molded with or fixedly connected to the locking ring, these parts form a unit, which can be connected as a whole to the stand pipe. An unlocking of the locking ring can take place here in an advantageous manner only when the unlocking means, which are required for unlocking the locking guides in response to the installa- tion of the filter insert, are brought into unlocking engagement with the locking guides in the suitable design and arrangement. A particularly reliable function is attained due to the direct impact of the unlocking means onto the locking guides.

The locking guides thereby preferably run in axial direction. The locking guides can thus be embodied with a sufficiently large length, which provides for the required radial movability without special articulations without any problems. At least the locking guides consist of a flexible material for this purpose.

In a further preferred manner, provision is made for the locking guides to consist of a resilient material. In this embodiment, the force, which prestresses the locking guides in locking direction, can simply be created by means of the material itself, which eliminates separate springs or similar parts.

A further embodiment proposes for the locking ring to be hollow-cylindrical and to be attached to the stand pipe on the outside and for the locking guides to be provided on the stand pipe and in each case to encompass a locking nose, which is oriented radially outwardly, wherein the locking noses can be engaged with and disengaged from an end side of the locking ring. A simple and good guide of the locking ring on the stand pipe is attained in this embodiment. The locking ring simultaneously protects the locking guides from harmful external influences, which benefits a permanently reliable function.

In terms of a simple design having a high functional reliability, provision is preferably made for the locking guides to encompass a cam in each case, which radially protrudes in locking direction and for the unlocking means to engage with the cams when the filter insert is plugged onto the stand pipe and for the locking guides to pivot radially in unlocking direction.

To prevent that the locking guides are bent in locking direction or even broken off accidentally or due to intentional manipulation, it is proposed for a stop, which defines the movement thereof in locking direction, to be assigned to each locking guide.

So as to attain a design, which is as simple as possible and reliable in view of the unlocking means, the unlocking means are preferably formed by ribs, which protrude radially in unlocking direction of the locking guides. When the filter insert is inserted into the filter housing, these ribs ensure a pivoting of the locking guides, so as to enable the locking ring to be pushed in on the stand pipe and so as to be able to completely insert the filter insert into the filter housing and so as to be able to engage the corresponding sealing surface with one another.

An alternative embodiment of the filter according to the invention in view of the locking device proposes for the locking device to be formed by means of guide means, which are arranged on the outer periphery of the stand pipe and on the inner periphery of the locking ring, which together form a locking stage and an axial or transverse guide, which is offset thereto in peripheral direction, for the guide means to lock the locking ring in its pushed-out position against an axial insertion relative to the stand pipe by means of the locking stage and for the locking pin to be twistable into an unlocked position in peripheral direction by means of the unlocking means when the filter insert is plugged onto the stand pipe and then to be capable of being inserted along the axial or transverse guide. In this embodiment of the locking device, the elements thereof are also embodied integrally with the stand pipe and the locking ring, so that separate component parts are also not required here for this purpose. An unlocking of the locking ring can also take place here in the desired manner only when the unlocking means, which are required for unlocking the locking device, are present in the suitable embodiment and arrangement when the filter insert is fitted.

In a concrete further development, provision is preferably made for one or a plurality of interacting inclined planes to be in each case arranged on the inner periphery of the filter insert and on the outer periphery of the locking ring such that the locking ring is set into a limited rotation in response to an axial displacement of the filter insert. The interacting inclined planes, which are provided here, are a simple and reliable means for creating the desired limited rotation of the locking ring for the purpose of unlocking.

To attain an arrangement comprising an advantageous design, the inclined planes on the filter insert side are preferably arranged on the inner periphery of the central through hole of the end disc.

To also attain an arrangement, which is simple and simultaneously advantageous from a functional point of view, in view of the interacting guide means on the stand pipe and on the locking ring, it is proposed for the guide means, which are arranged on the outer periphery of the stand pipe, to be formed by at least one protruding web, which forms a guide contour, and for the guide means, which are arranged on the inner periphery of the locking ring, to be formed by means of at least one guide nose, which protrudes into the guide contour. The guide nose can thus move within the guide contour, but cannot be moved beyond the guide contour, which is formed by means of the protruding web. Advantageously, the guide contour, which is formed by means of the protruding web, as well as the guide nose, can be embodied so as to be integrally molded with the respective assigned component.

To ensure that the locking ring assumes its locked position reliably when the filter insert is removed from the filter housing, it is proposed for the guide means, which are arranged on the outer periphery of the stand pipe, to encompass a guide bevel, which positively guides the locking ring into its locked position in response to its push-out movement.

For all of the above-described embodiments of the filter, provision is preferably made on the outer periphery of the stand pipe for position guide means, which interact with the unlocking means or with guide means, which are additionally arranged on the inner periphery of the filter insert and which positively guide the unlocking means in peripheral direction into a position, which is suitable for engagement for the locking guides of the stand pipe or for the inclined planes of the locking ring when the filter insert is plugged on, and which then lock the filter insert against being twisted in peripheral direction. The correct installation position of the mentioned parts relatively to one another is effected through this even without particular attention by operating personnel and without the necessity of an accurate manual positioning of filter insert and locking ring relative to one another. When embodying the filter with an unlocking device, which must carry out a limited twisting of the locking ring, the operating personnel must thus also not ensure that the filter insert does not carry out a rotation in peripheral direction when it is inserted into the filter housing.

A further contribution to a cost-efficient production of the filter is that the force, which prestresses the locking ring in pushed-out direction, is preferably created by means of at least one pressure spring, which is arranged on the outside of the stand pipe and which is supported on the stand pipe or on the filter housing on the one hand and on the locking ring on the other hand. In the simplest case, the pressure spring can be a helical spring, which surrounds the stand pipe.

The invention also creates the possibility of providing locking devices, which are designed differently, and for unlocking means, which are designed differently, for forming a coded lock-key system, wherein a certain embodiment of the locking device can only be unlocked by means of a cer- tain, matching embodiment of the unlocking means. This can contribute to preventing the installation of unsuitable filter inserts into the filter housing.

In the case of many filters, provision is made for a filter bypass valve, which allows for a fluid flow directly from the untreated medium side to the clean medium side of the filter by bypassing the filter cloth body, when the filter cloth body is clogged by dirt particles. A particularly advantageous integration of such a filter bypass valve into the filter according to the invention is attained, when, as is proposed in a further development according to the invention, an end disc of the filter insert encompasses a valve seat for a valve body on the filter housing side, which is prestressed with a force acting in valve closing direction, for forming a filter bypass valve. Advantageously, no additional valve seat component is required hereby for realizing the filter bypass valve, because the valve seat is provided on the end disc of the filter insert.

In the case of filters, it is desirable in many cases to provide for an emptying of the filter housing in the context of a filter maintenance, before the filter insert is removed from the filter housing. For this purpose, provision is made in the case of the filter insert according to the invention for the filter housing to encompass an eccentrically arranged discharge channel in its bottom, for the filter insert to encompass an axially protruding, eccentric locking bolt for the discharge channel on the side of the end disc facing the bottom, which faces away from the filter cloth body, and for provision to be made for position guide means, which interact on the inner periphery of the filter insert and on the outer periphery of the stand pipe and which positively guide the filter insert in peripheral direction into a position of the locking bolt, which is suitable for engagement for the discharge channel, when the filter insert is plugged onto the stand pipe. In this embodiment of the filter, the discharge channel, which is arranged in the bottom of the filter housing, is closed reliable on the one hand when the filter insert is inserted, because it is ensured that the locking bolt is positioned so as to match the discharge channel. The position guide means mentioned herein for the locking bolt can thereby be separate means or also, which is preferable, simultaneously be position guide means, which are already provided for the engagement-suitable positioning of the unlocking means relative to the locking device. When the cover of the filter housing is removed in the context of a maintenance operation and when the filter insert is moved to the extent, which is sufficient for removing the locking bolt from the discharge channel, the liquid located in the filter housing and in the filter insert drains through the discharge channel. A filter insert, which is largely free of liquid, can thus be removed from the filter housing. As is known per see, the filter insert can thereby by latched to the cover, so as to transfer an axial traction force onto the filter insert, which moves the filter insert together with the cover in removal direction, when the cover is removed from the filter housing.

The above-described filter can be a standing filter, in the case of which the filter insert can be removed towards the top, as well as a hanging filter, in the case of which the filter insert can be removed towards the bottom.

In addition to the above-described locking ring as well as the corresponding locking device and the corresponding unlocking means, the filter according to the invention can also encompass a further locking device so as to increase the safeguarding against the use of unsuitable third-party filter inserts, wherein the further locking device encompasses an end piece, which is guided on the stand pipe so as to be capable of being displaced, and locking guides, which form a part of the stand pipe or of the end piece and which can be moved in radial direction, in each case comprising a locking surface, which faces in axial direction, wherein the locking guides are prestressed by means of a force, which acts in locking direction and in each case lock the end piece in its pushed-out position against an axial insertion relative to the stand pipe by means of its locking surface, and wherein the locking guides can be moved directly in radial direction into their unlocked position by means of the unlocking means. A double safeguard is attained in this manner, when particularly high demands are made in view of a safeguarding against the installation of unsuitable filter inserts into the filter housing. The invention finally also relates to a filter insert for being used in a filter wherein the filter insert consists of a hollow- cylindrical filter cloth body and two end discs, which sur- round it on the end side, the one end dise of which encom- passes a central through hole, wherein the filter insert can be plugged onto a central stand pipe, which forms part of the filter housing, with the open end disc first, and wherein pro- vision is made for unlocking means, which are guided with the filter insert and which actuate a locking device in unlock- ing direction when the filter insert is plugged onto the stand pipe, and which enable the filter insert to be plugged on completely. The filter insert is characterized in that the unlocking means are arranged or integrally molded on the filter insert. It is attained through this that only a certain filter insert can be fitted into a certain filter, wherein separate unlocking means are not required.

BRIEF DESCRIPTION OF THE DRAWINGS

Exemplary embodiments of the invention will be defined below by means of a drawing.

*FIG. 27 shows an alternative embodiment of the unlocking means arranged on a separate unlocking means body.*

DETAILED DESCRIPTION OF THE PREFERRED EMBODIMENTS

Figure 1:
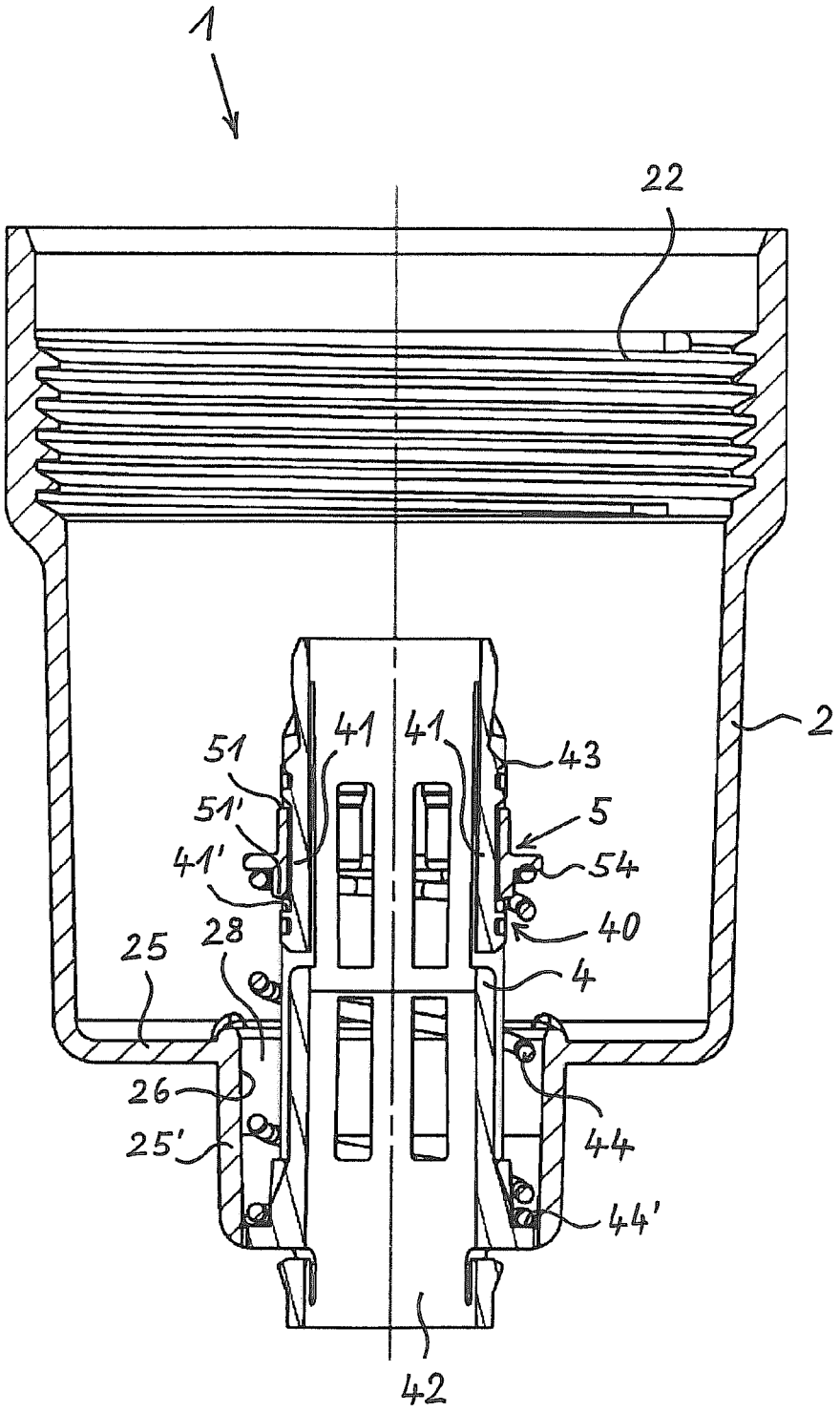
FIG. 1 shows a filter in a first embodiment comprising an open filter housing and without filter insert, in longitudinal section.

FIG. 1 shows a filter 1 in a first embodiment, comprising an open filter housing 2 and without filter insert, in longitudinal section. The filter housing 2 is cup-shaped with a bottom 25, in the center of which a hollow-cylindrical bottom part 25', which continues downwards, is located. The inner periphery of this bottom part 25' forms a sealing surface 26 for a seal 36 of a filter insert 3, which is not yet fitted here. On its upper end, the housing 2 has a thread 22 for being screwed to a cover 21, which is removed here. A stand pipe 4, the lower end of which is connected to the filter housing 2 and which extends upwards from that location until approximately half of the height of the filter housing 2, is arranged centrally in the interior of the filter housing 2.

A locking ring 5 is displaceably guided on the stand pipe 4 so as to be defined in axial direction. In its pushed-out direction, which faces upwards, the locking ring 5 is prestressed by the force of a spring 44, the lower end of which is supported on a spring support 44' in the hollow-cylindrical bottom part 24' and the upper end of which is supported on a spring support 54 on the locking ring 5. In FIG. 1, the locking ring 5 is thus in its pushed-out position due to the effect of the spring 44. In this pushed-out position, an upper edge 51 of the locking ring 5 rests against a stop, here in the form of cams 43, which is embodied on the stand pipe 4.

The stand pipe 4 encompasses a locking device 40, by means of which the locking ring 5 can be locked in its pushed-out position. Here, the locking device 40 comprises two resilient locking guides 41, which run in axial direction and which are embodied so as to be integrally molded with the stand pipe 4. In each case close to the lower end of each locking guide 41, the latter, on its outer side, in each case encompasses a locking surface 41', which points upwards in axial direction and which is located directly below a lower edge 51' of the locking ring 5. The locking ring 5 is thus prevented from being inserted downwardly.

Figure 2:
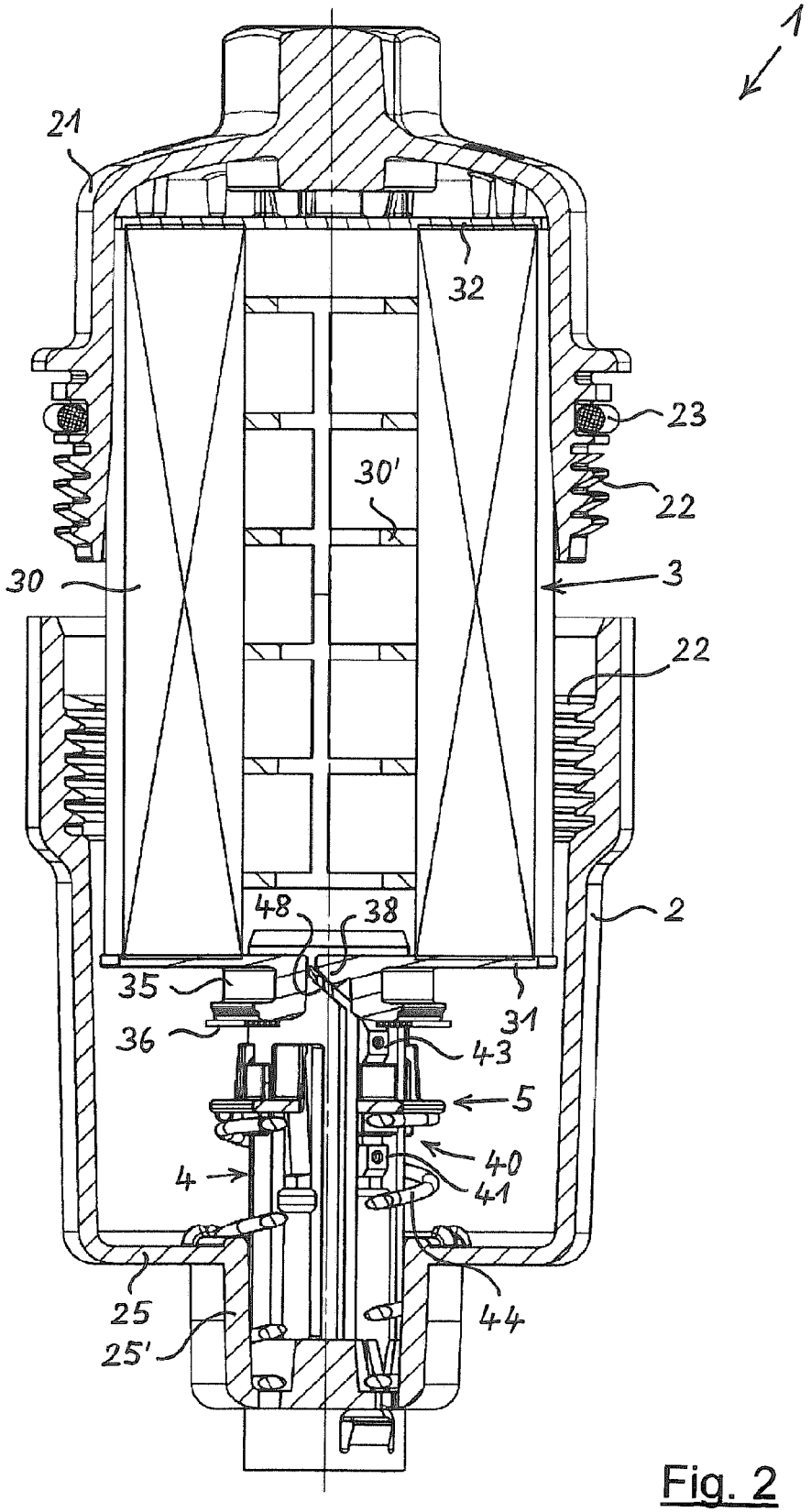
FIG. 2 shows the filter from FIG. 1, comprising a partially inserted filter insert and comprising a cover, in longitudinal section.

FIG. 2 shows the filter 1 from FIG. 1, comprising a partially inserted filter insert 3 and comprising a cover 21 in longitudinal section. The filter insert 3 consist of a hollow-cylindrical filter cloth body 30, for example of a filter paper, which is folded in a zigzag-shaped manner and which is surrounded on the end side by a lower end disc 31 and an upper end disc 32. A hollow-cylindrical support grid 30' is arranged in the interior of the filter cloth body 30 for supporting the latter from collapsing during operation. The lower end dise 31 is embodied so as to be open in its center and is plugged onto the stand pipe 4. On the bottom side, an annular appendage 35, on the lower end of which a seal 36, here a radial sealing ring, is attached, extends downwards from the lower end disc 31. To be able to install the filter insert 3, the latter has an unlocking means, which is not visible here, by means of which the locking device 40 can be unlocked. To bring the unlocking means into an engagement-suitable position for the locking guides 41, interacting position guide means 48 and 38 are arranged on the outer periphery of the stand pipe 4 and on the inner periphery of the lower end dise 31. In peripheral direction, said position guide means guide the filter insert 3 into a position, in which the unlocking means are located so as to match the locking guides 41. The unlocking means then interact with the cams 43 on the locking guides 41, so as to pivot the locking guides 41 inwards in radial direction and to thus unlock the locking device 40.

Figure 25:
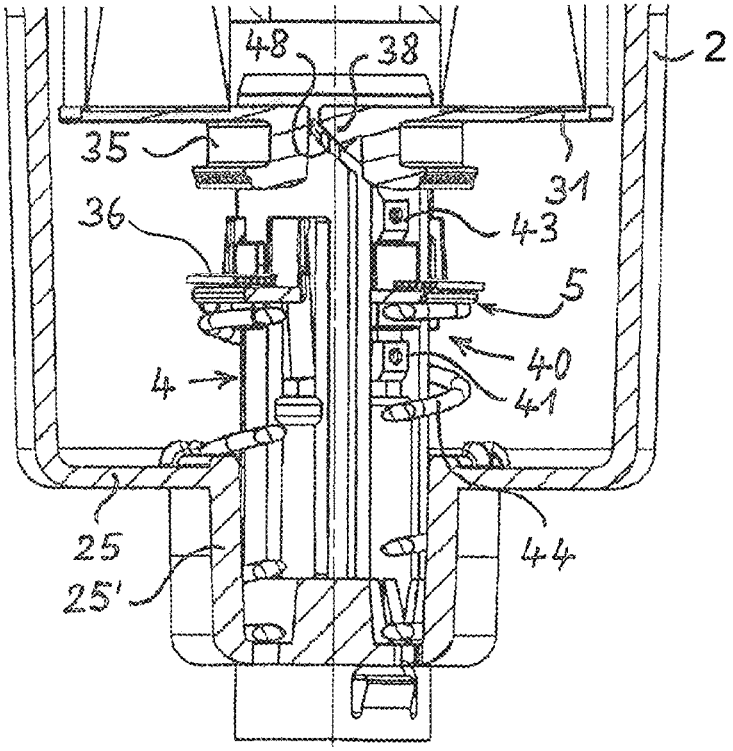
*FIG. 25 shows a lower end of an alternative embodiment of the filter with the seal provided on the locking ring.*

*FIG. 25 shows an alternative embodiment of the filter 1 in which the seal 36 is provided on the locking ring 5 rather than on the annular appendage as shown in FIG. 2.*

The cover 21 of the filter housing 2, which also encompasses a thread 22 on its lower edge for being screwed to the filter housing 2, can also be seen on the top in FIG. 2. The filter housing 2 and the cover 21 are then sealed against one another so as to be liquid-tight by means of a seal 23.

Figure 3:
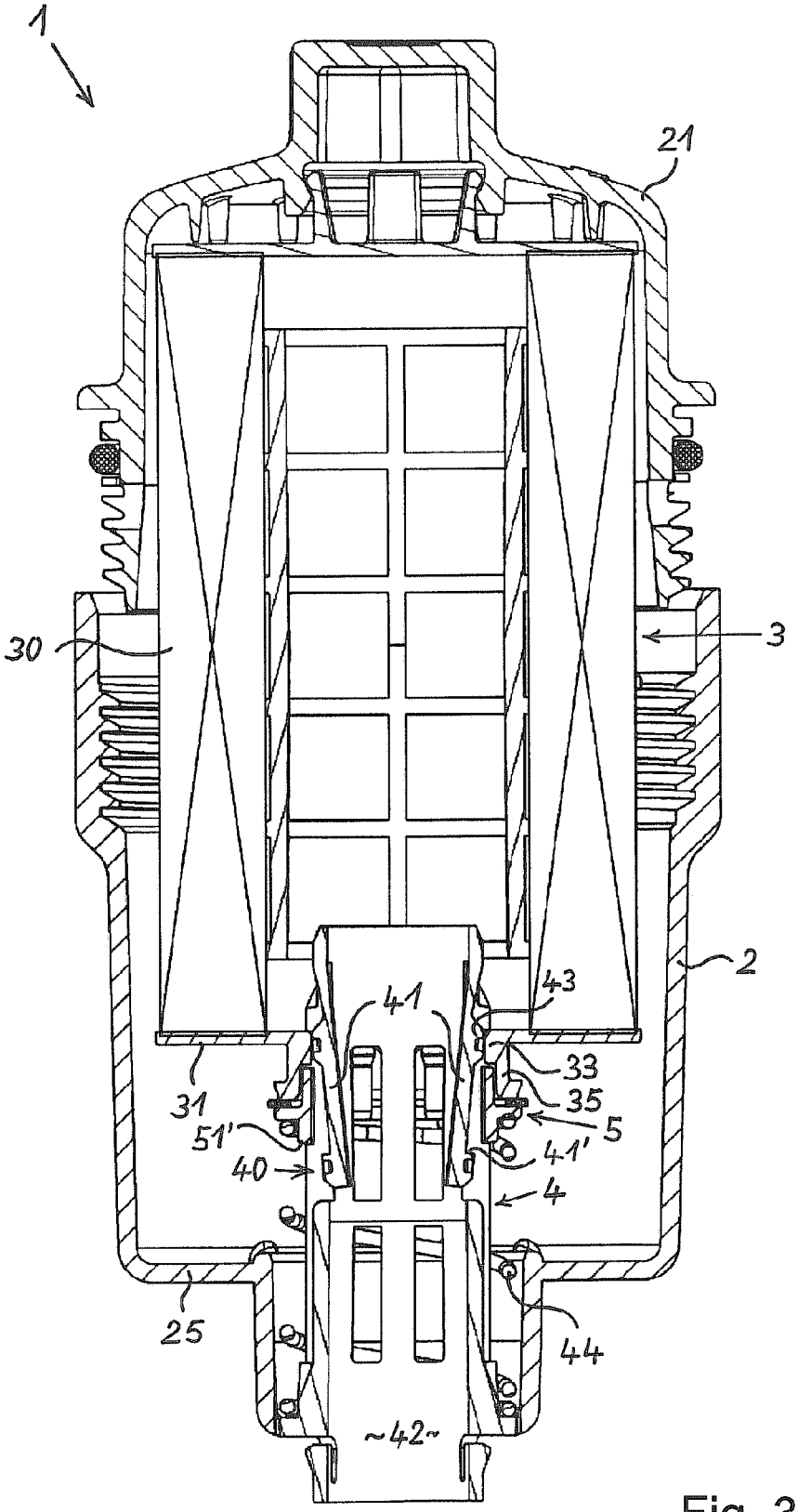
FIG. 3 shows the filter from FIGS. 1 and 2, comprising the further inserted filter insert, in longitudinal section.

FIG. 3 shows the filter 1 from FIGS. 1 and 2, comprising the further inserted filter insert 3, again in longitudinal section. The rib-shaped unlocking means 33, which, in the state according to FIG. 3, interact in particular in an unlocking manner with the cams 43 of the locking guides 41, can now be seen radially inwardly on the lower end disc 31 of the filter insert 3. The locking guides 41 are now in their released position, which is pivoted radially inside, in which the locking surfaces 4' are located radially inward of the lower edge 51' of the locking ring 5. A downward displacement of the locking ring 5 against the force of the spring 44 is thus enabled.

Figure 4:
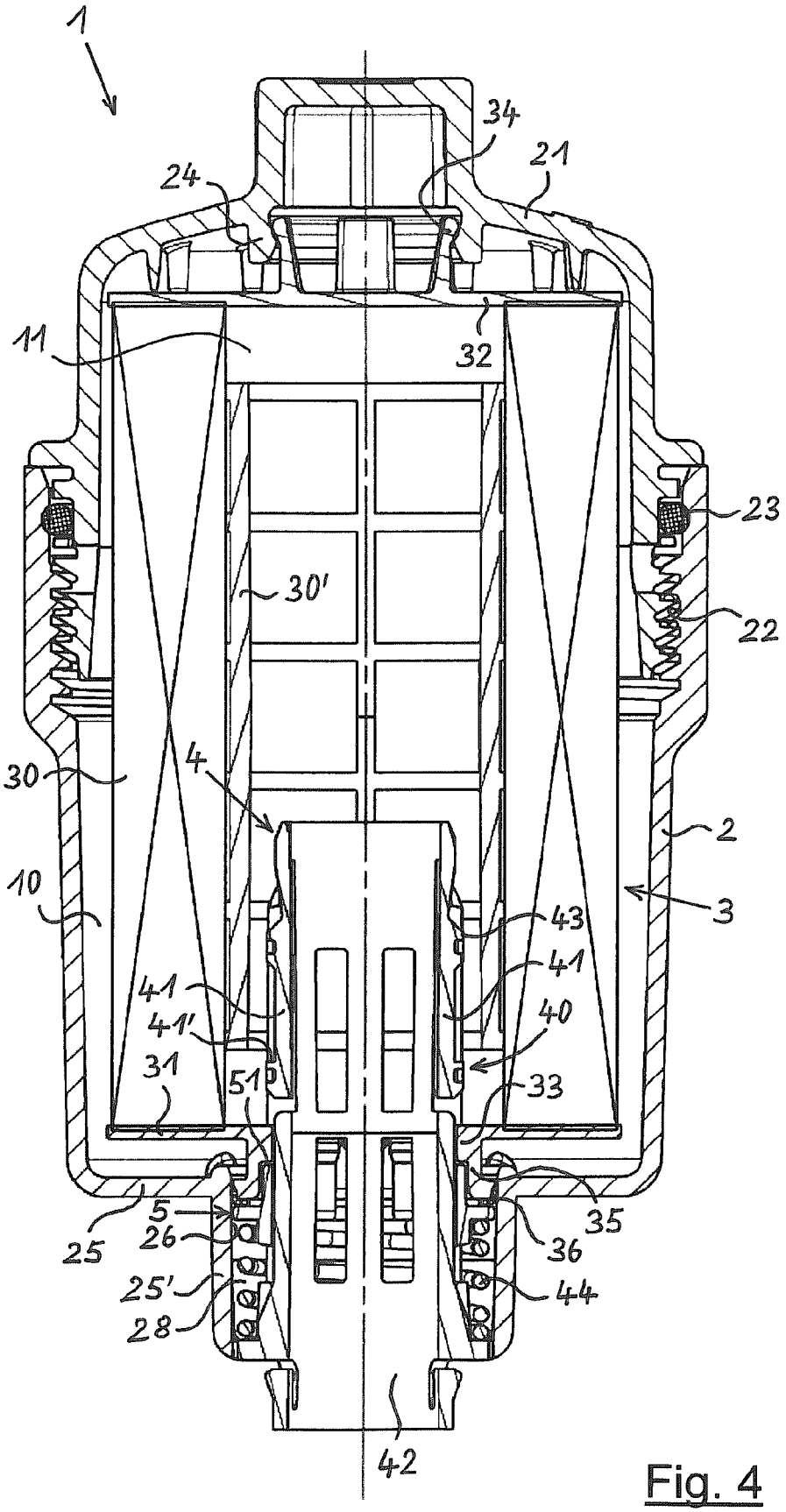
FIG. 4 shows the filter from FIGS. 1-3, comprising a completely inserted filter insert and attached cover, in longitudinal section.

FIG. 4 shows the filter 1 from FIGS. 1 to 3, comprising a completely inserted filter insert 3 and attached cover 21, again in longitudinal section. The unlocking means 33 are now displaced downwards beyond the locking guides 41, whereby the resilient locking guides 41 are returned into their initial position. The lower end disc 31 of the filter insert 3 is now located at a small distance above the bottom 25 of the filter housing 2. The hollow-cylindrical bottom part 25' and the lower part of the stand pipe 4 form an annular gap 28, into which the locking ring 5 is now displaced and which also accommodates the spring 44 below the locking ring 5. The annular appendage 35, which starts at the bottom side of the lower end disc 31 and which supports the seal 36, furthermore protrudes into the annular gap 28 above the locking ring 5, whereby the seal 36 now comes to a tight rest against the sealing surface 26. An untreated medium side 10 of the filter 1 is thus separated from a clean medium side 11 in a liquid-tight manner and the filter is ready for operation. During operation, a liquid, which is to be filtered, flows via a non-illustrated inlet to the untreated medium side 10 of the filter 1, flows through the filter cloth body 30 in radial direction from outside to inside and then leaves the filter 1 through a liquid discharge channel 42, which is embodied in the hollow interior of the stand pipe 4. The support grid 30' thereby protects the filter cloth body 30 from collapsing inwardly in radial direction.

Figure 26:
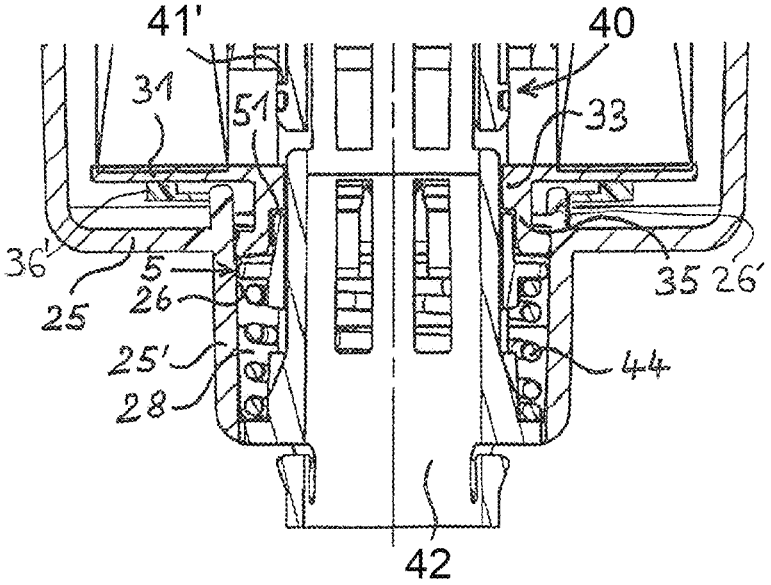
*FIG. 26 shows a lower end of an alternative embodiment of the filter with the seal extending radially inwardly to engage an outer peripheral sealing surface of the hollow-cylindrical bottom part.*

*FIG. 26 shows an alternative embodiment of the filter 1 in which the seal 36' is supported on the lower end disc 31 and has a portion which extends radially inwardly to tightly engage with an outer peripheral sealing surface 26' of the hollow-cylindrical bottom part 25' to separate the untreated medium side of the filter 1 from a clean medium side.*

It can be seen on the very top of FIG. 4 that, on the upper side of its upper end dise 32, the filter insert 3 encompasses snap-in pins 34, which protrude upwards and which are in locking engagement with suitably arranged snap-in pins 24 on the bottom side of the cover 21. The cover 21 can exert an axial traction force on the filter insert 3 via this locking engagement, when the cover 21 is unscrewed from the filter housing 2. The cover 21 takes along the filter insert 3 through this.

Figure 5:
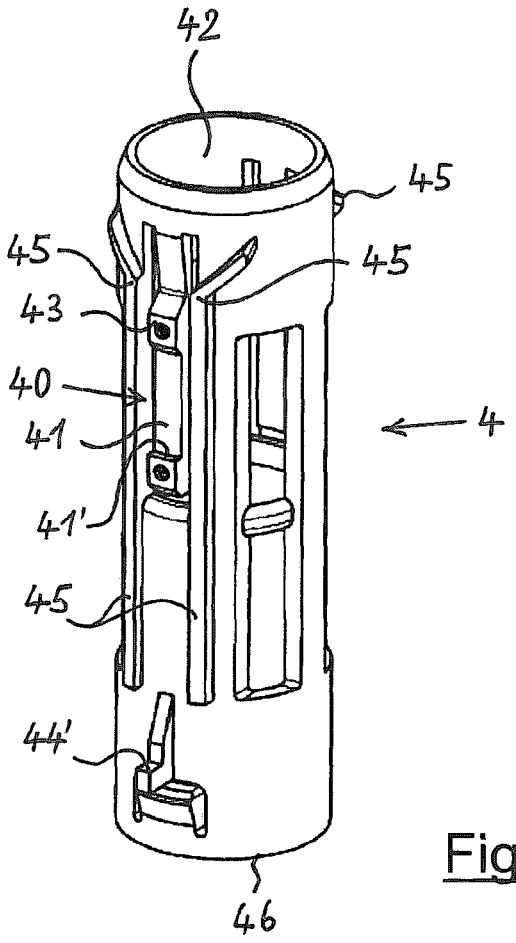
FIG. 5 shows a stand pipe of the filter according to FIGS. 1 to 4 as component part, in top view.

FIG. 5 of the drawing shows a stand pipe 4 of the filter 1 according to FIGS. 1 to 4 as component part in top view. The stand pipe 4 has a hollow-cylindrical basic shape. With its lower end 46, the stand pipe 4 can be connected to the filter housing 2, for example by means of screwing or latching. In its upper part, opposite one another, the stand pipe 4 has the two locking guides 41 with its respective locking surface 41' for forming the locking device 40.

Guide contours 45, which serve the purpose of bringing the unlocking means 33 provided on the filter insert 3 into a twist position, which is engagement-suitable for the locking guides 41 and the cams 43 thereof, are furthermore integrally molded on the outer periphery of the stand pipe 4. At the same time, the lower part of the guide contours 45 serves to safeguard the locking ring 5 from twisting. The liquid discharge channel 42 runs through the interior of the stand pipe 4. Finally, a spring support 44' for the spring 44 is visible on the very bottom of the stand pipe 4.

Figure 6:
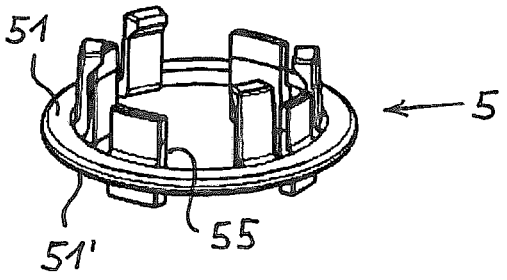
FIG. 6 shows a locking ring of the filter according to FIGS. 1 to 4 as component part, in top view.

FIG. 6 shows the locking ring 5 of the filter 1 according to FIGS. 1 to 4 as component part in top view. The locking ring 5 has a circumferential upper edge 51 and a circumferential lower edge 51' as well as a plurality of guide noses 55 radially on the inside, which interact with the above-mentioned guide contour 45 on the stand pipe 4, when the locking ring 5 is attached to the stand pipe 4.

Figure 7:
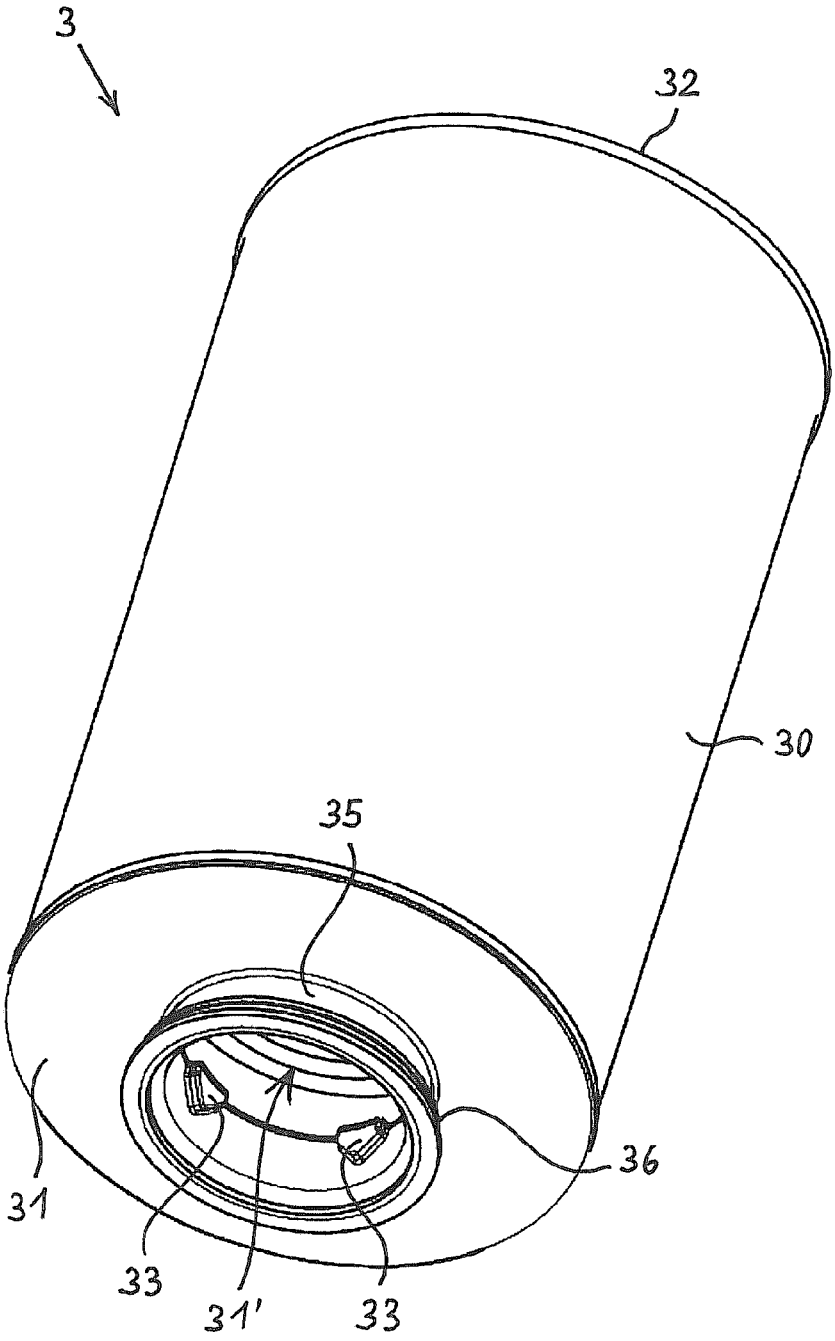
FIG. 7 shows a filter insert of the filter according to FIGS. 1 to 4 as component part, in top view.

FIG. 7 shows a filter insert 3 of the filter 1 according to FIGS. 1 to 4 as component part in top view. The two end discs 31 and 32, between which the filter cloth body 30 is arranged, can be seen on the bottom and on the top. In the center, the lower end disc 31 has the through hole 31', by means of which it can be plugged onto the stand pipe 4. The annular appendage 35, which surrounds the through hole 31' and which, on its lower end, supports the seal 36, which faces readily outwardly, extends downwards from the lower end disc 31. The unlocking means 33, which serve to release the locking device 40, concretely for pivoting the locking guides 41 radially inwardly in release direction, when the filter insert 3 is plugged onto the stand pipe 4, are visible on the inner periph- ery of the annular appendage 35.

*FIG. 27 shows an alternative embodiment of the filter 1 in which the unlocking means 33 are arranged on a separate unlocking means body 60 having a center through opening 62 by mean of which it can be plugged onto the stand pipe 4.*

In the case of the above-described exemplary embodiment, the locking device 40 comprises a plurality of resilient locking guides 41. Exemplary embodiments, in the case of which the locking device 40 is embodied differently, will be described below.

Figure 8:
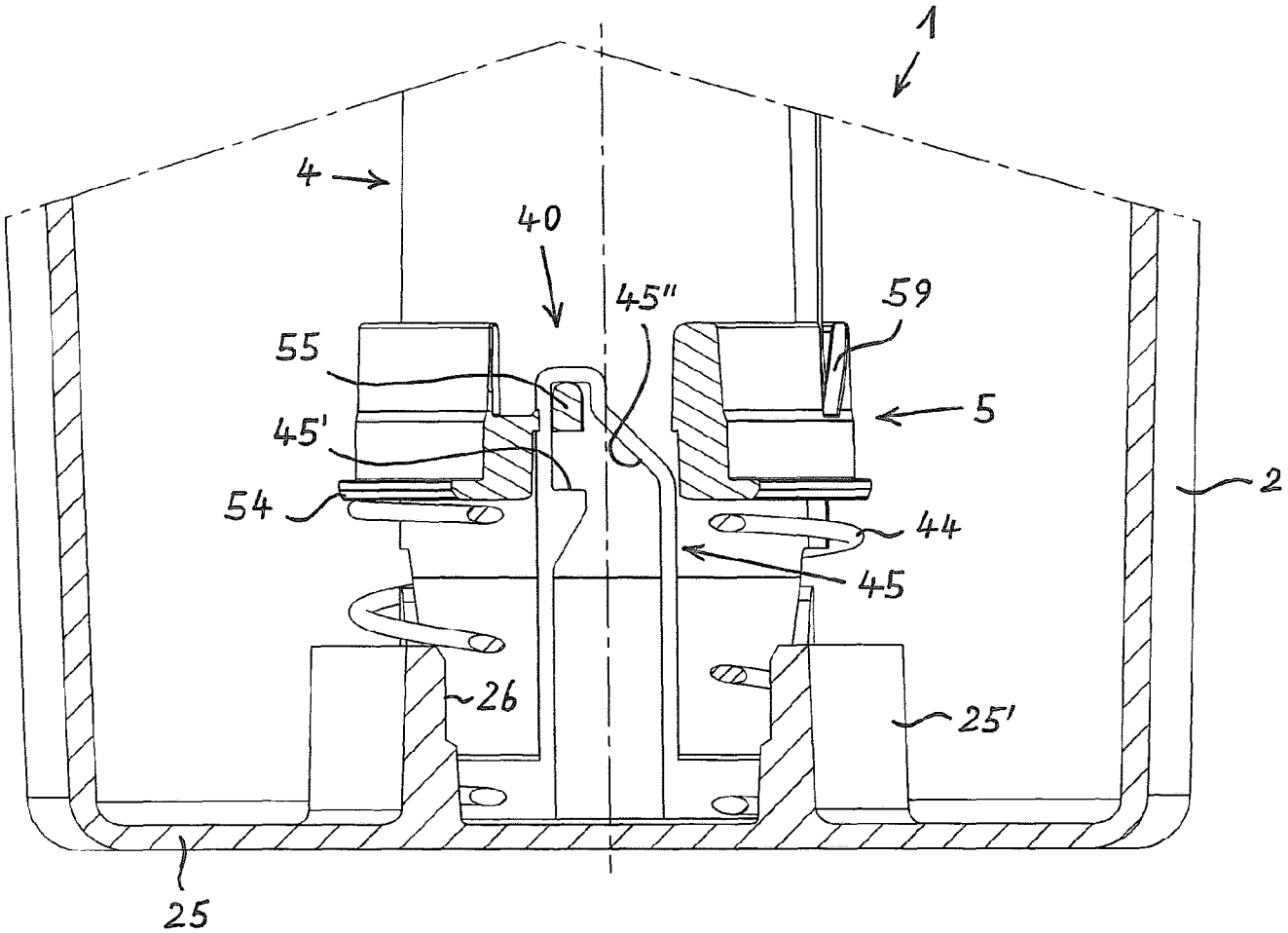
FIG. 8 shows a filter in a second embodiment in a longitudinal section through the lower area of the filter, without filter insert.

FIG. 8 shows a filter 1 in a second embodiment in a longitudinal section through the lower area of the filter 1, here still without filter insert. On the outside, a part of the filter housing 2 comprising the bottom 25 can be seen. The hollow-cylindrical bottom part 25', the inner periphery of which forms the sealing surface 26, is located in the center of the bottom 25.

The stand pipe 4 is arranged in the center of the housing 2. The locking ring 5 is arranged so as to be displaceable in axial direction on the stand pipe 4. Here, the locking ring 5 can additionally also be twisted to a limited extent in peripheral direction relative to the stand pipe 4. The locking ring 5 is also prestressed here with a force, which acts in the pushed-out direction thereof, that is, upwards according to FIG. 8, and which is also created here by means of a helical spring 44. Due to the fact that a filter insert has not yet been inserted into the housing 2 in FIG. 8, the spring 44 ensures that the locking ring 5 assumes its pushed-out position. In this pushed-out position of the locking ring 5, the latter is furthermore locked from being inserted in axial direction, that is, downwards according to FIG. 8. This is attained by means of a guide contour 45, which forms part of the locking device 40, on the outer periphery of the stand pipe 4. The guide contour 45 encompasses a locking stage 45', which is oriented upwards, and which, in the state according to FIG. 8 is located in axial direction, exactly below a guide nose 55 on the inner periphery of the locking ring 5. When a force, which acts from the top to the bottom only in axial direction, is exerted onto the locking ring 5, the guide nose 55 thereof reaches the locked stage 45', whereby a further axial displacement is prevented.

To release the locking device 40, the locking ring 5 must also carry out a rotary motion in addition to its downwards axial movement, so that the guide nose 55 can be moved past the locked stage 45'. For this purpose, a plurality of inclined planes 59, one of which can be seen in FIG. 8, are integrally molded on the outer periphery of the locking ring 5. The inclined planes 59 interact with inclined planes 39 on the filter insert 3 (see FIG. 14), when the filter insert 3 is attached to the stand pipe 4 and ensure that the axial movement of the filter insert 3 creates a limited rotary motion of the locking ring 5 in unlocking direction. Within the guide contour 45, the guide nose 55 thus reaches a position, in which it is offset in peripheral direction against the locked stage 45', whereupon a further movement of the locking ring 5 in downwards axial direction is then free.

Figure 9:
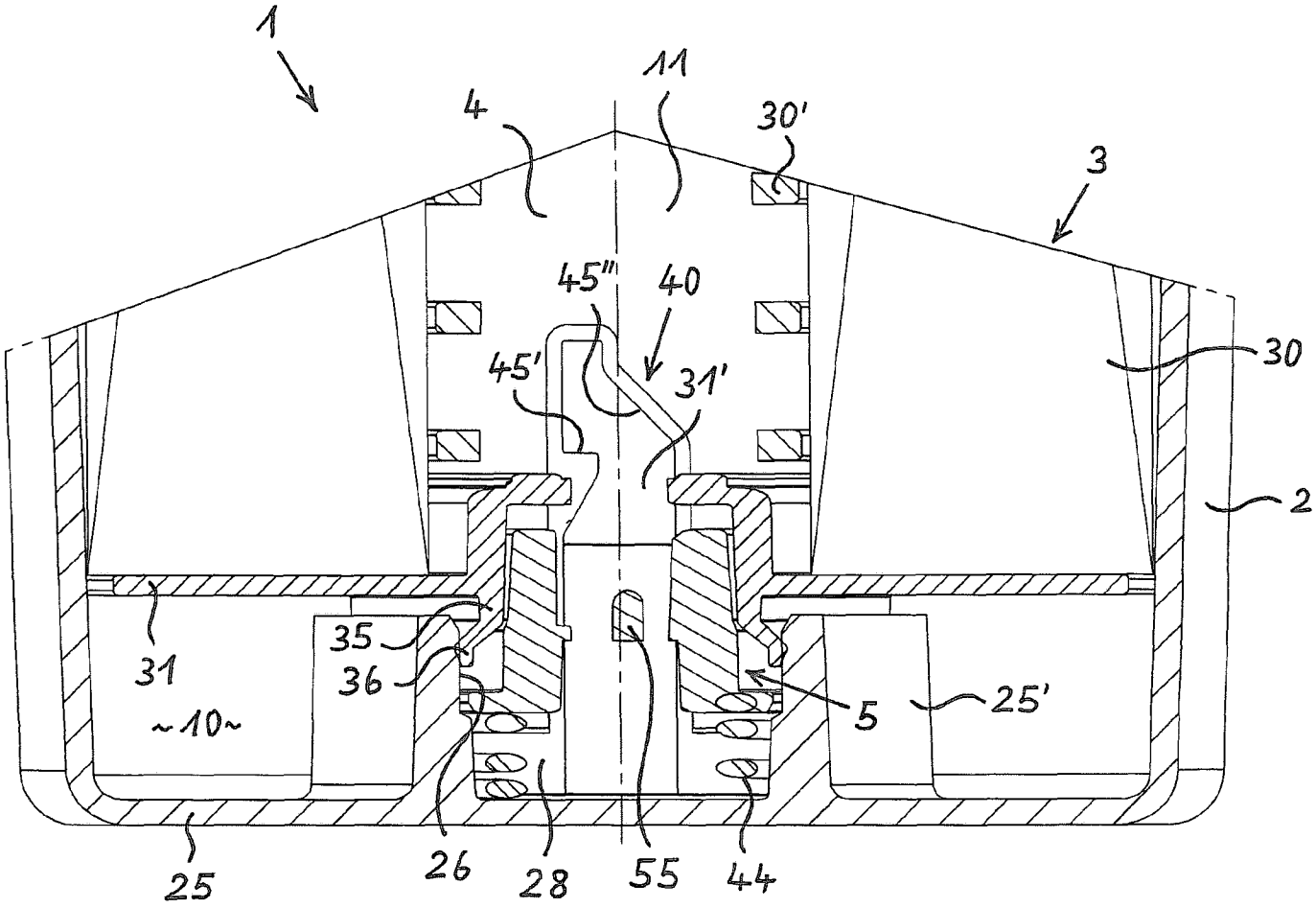
FIG. 9 shows the filter from FIG. 8, comprising an fitted filter insert, in a first longitudinal section.

FIG. 9 shows the filter 1 from FIG. 8 comprising a completely fitted filter insert 3 in a first longitudinal section, which is located upstream of the center axis of the filter housing 2. The locking ring 5 is now displaced into its inserted position and the guide nose 55 of the locking ring 5 is now in a position axially below the locked stage 45' as well as offset in peripheral direction to the locked stage 45'. The spring 44 is now compressed and is held in this state via the locking ring 5 by means of the filter insert 3. A displacement of the filter insert 3 back to the top is prevented by means of a cover 21, which is not illustrated here, which is attached to the housing 2.

The annular appendage 35 on the bottom side of the lower end disc 31 now protrudes into the hollow-cylindrical bottom part 25' of the bottom 25 of the filter housing 2, together with the seal 36, which is supported by it, and the seal 36 now rests tightly against the sealing surface 26.

Figure 10:
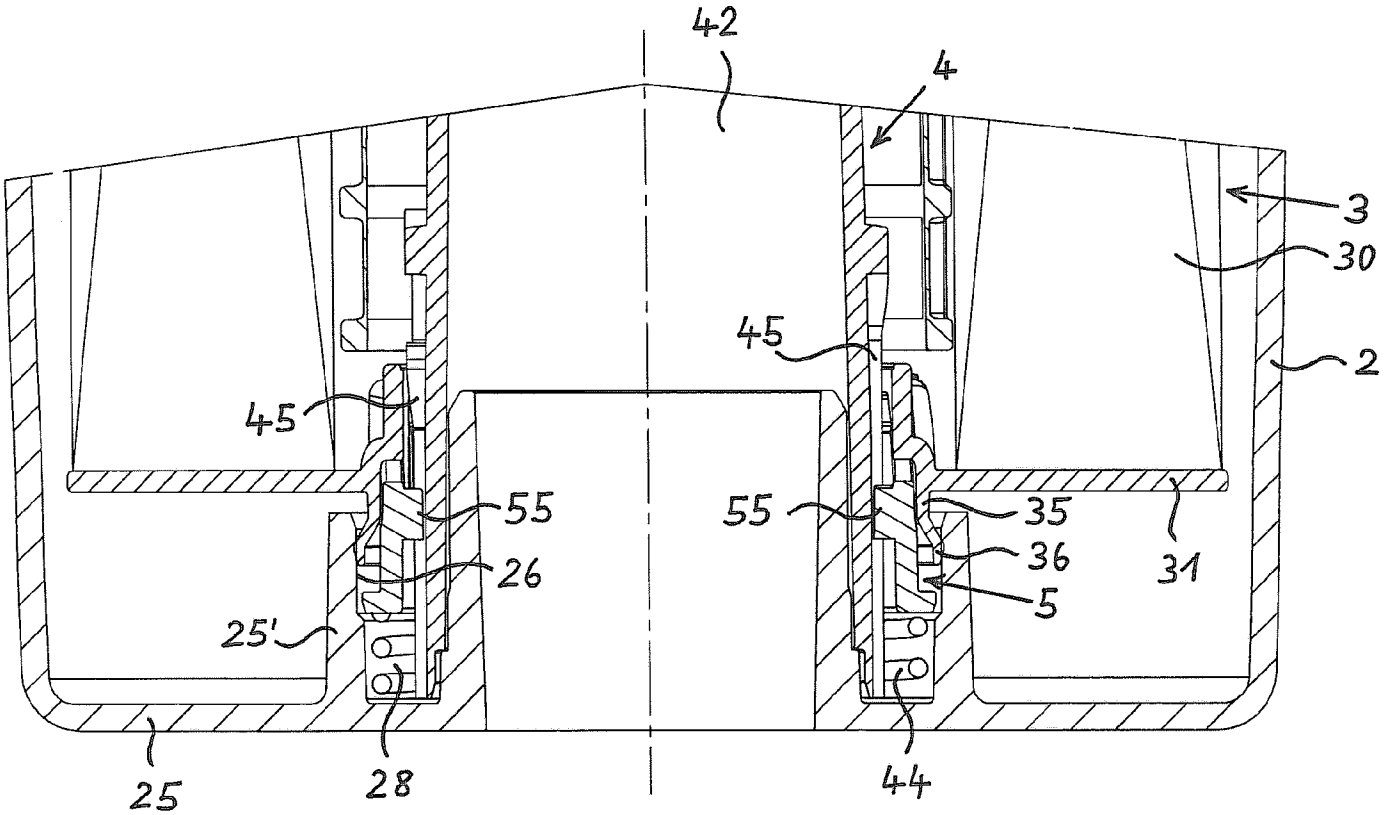
FIG. 10 shows the filter from FIG. 9 in a second longitudinal section.

FIG. 10 shows the filter from FIG. 9 in a second longitudinal section, which runs through the center axis of the filter housing 2. It can also be seen here that the locking ring 5 and, below it, the spring 44 are located in the annular gap 28 between the hollow-cylindrical bottom part 24' and the lower part of the stand pipe 4. It can again be seen that the annular appendage 35 of the lower end disc 31 engages into the annular gap 28 by means of the seal 36, whereby the seal 36 rests tightly against the sealing surface 26.

Radially inside the locking ring 5, the guide noses 55 thereof are visible, which are guided in the guide contour 45 on the outer periphery of the stand pipe 4.

Figure 11:
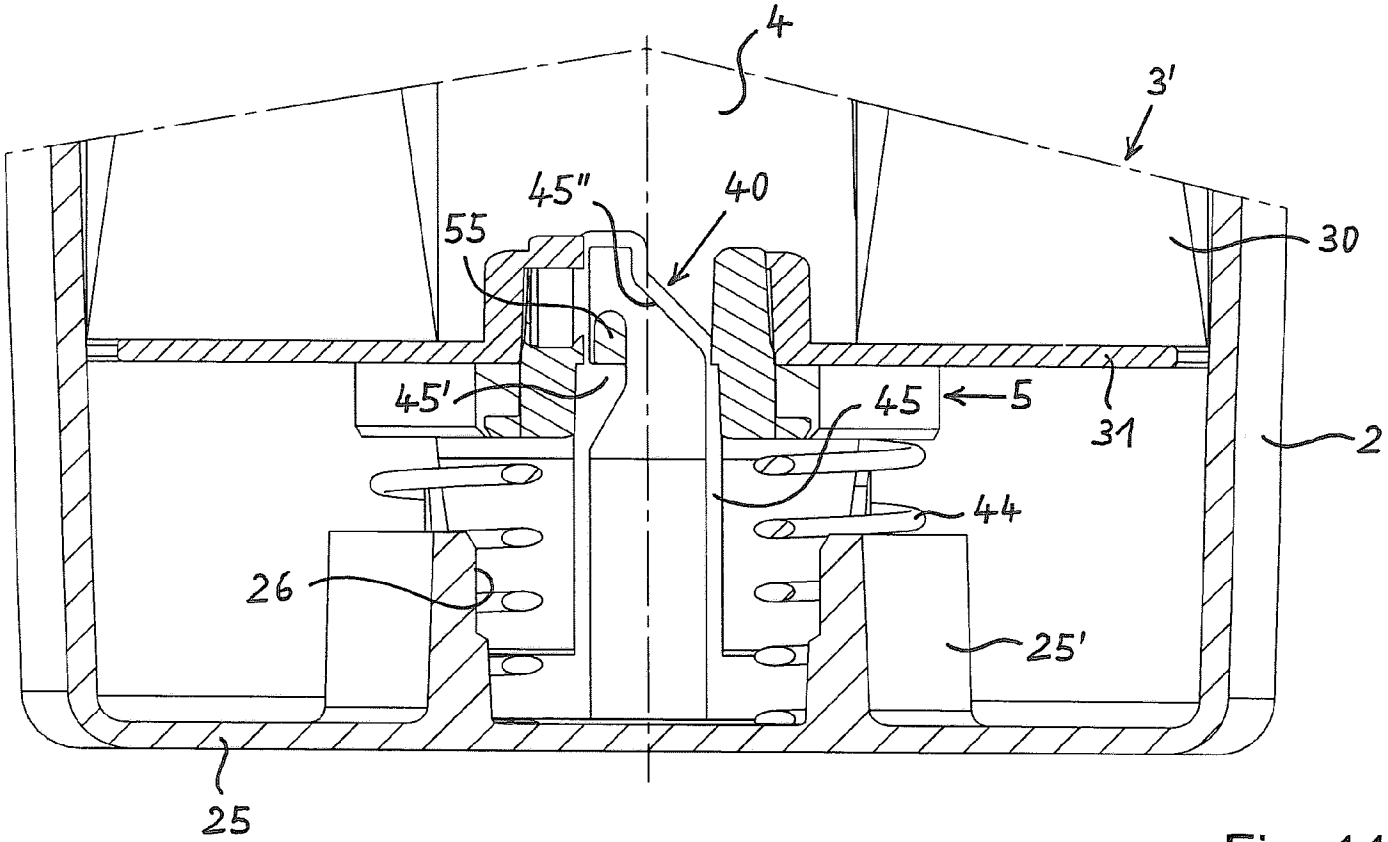
FIG. 11 shows the filter from FIGS. 8 to 10, comprising an unsuitable third-party filter insert, in longitudinal section.

FIG. 11 shows the filter 1 from FIGS. 8 to 10, comprising an unsuitable third-party filter insert 3' in longitudinal section. The third-party filter insert 3' differs from the filter insert 3 in that it does not encompass the unlocking means 33, which are required for releasing the locking device 40. As a result, the lower end disc 31 can only move the locking ring 5 downwards purely axially until the guide nose 55 of the locking ring 5 impacts the locked stage 45' of the guide contour 45 on the outer periphery of the stand pipe 4 when the filter insert 3' is inserted into the filter housing 2. A further insertion of the filter insert 3' into the filter housing 2 is now no longer possible. A liquid-tight separation into an untreated medium side and clean medium side of the filter housing 2 is not attained. It is also impossible to attach the cover 21 to the filter housing 2, because the filter insert 3' still protrudes too far from the filter housing 2 on the top.

Figure 12:
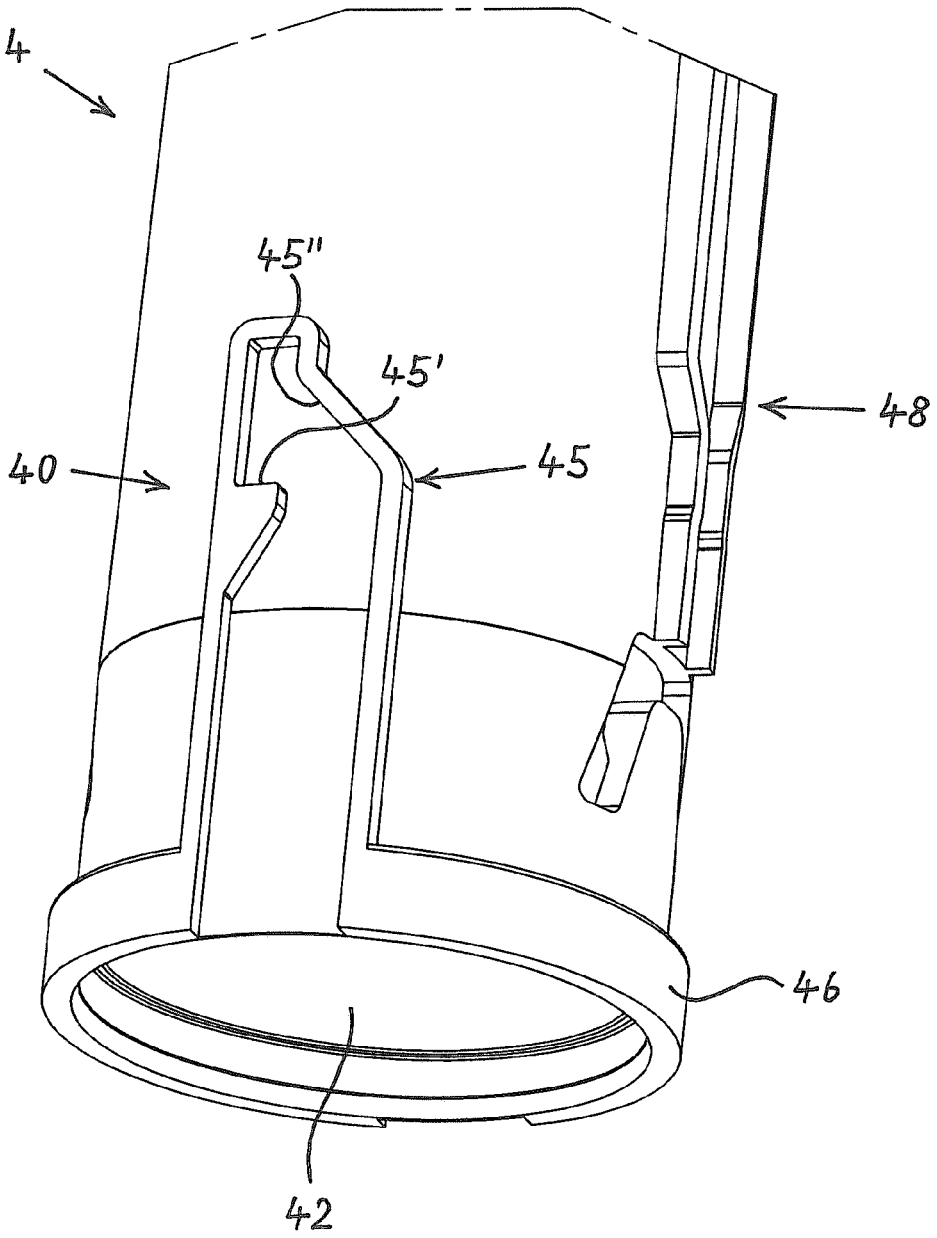
FIG. 12 shows the lower part of a stand pipe of the filter from FIGS. 8 to 11, as component part in top view.

In an enlarged illustration, FIG. 12 shows the lower part of the stand pipe 4 of the filter 1 from FIGS. 8 to 11 as component part in top view. The liquid discharge channel 42 runs through the hollow interior of the stand pipe 4. On the one hand, two guide contours 45 are arranged, here integrally molded, on the outer periphery of the stand pipe 4, so as to be located opposite one another in pairs, and, on the other hand, the position guide means 48 are arranged in peripheral direction therebetween, also so as to be located opposite one another in pairs. As already explained above, the guide contour 45 comprises the locked stage 45' as well as the guide bevel 45", which serves the purpose of bringing the locking ring 5 back into the locked position, in which the guide nose 55 thereof is located exactly axially above the locked stage 45', when returning it in pushed-out direction. The lower end 46 of the stand pipe 4 serves for connection to the filter housing 2.

Figure 13:
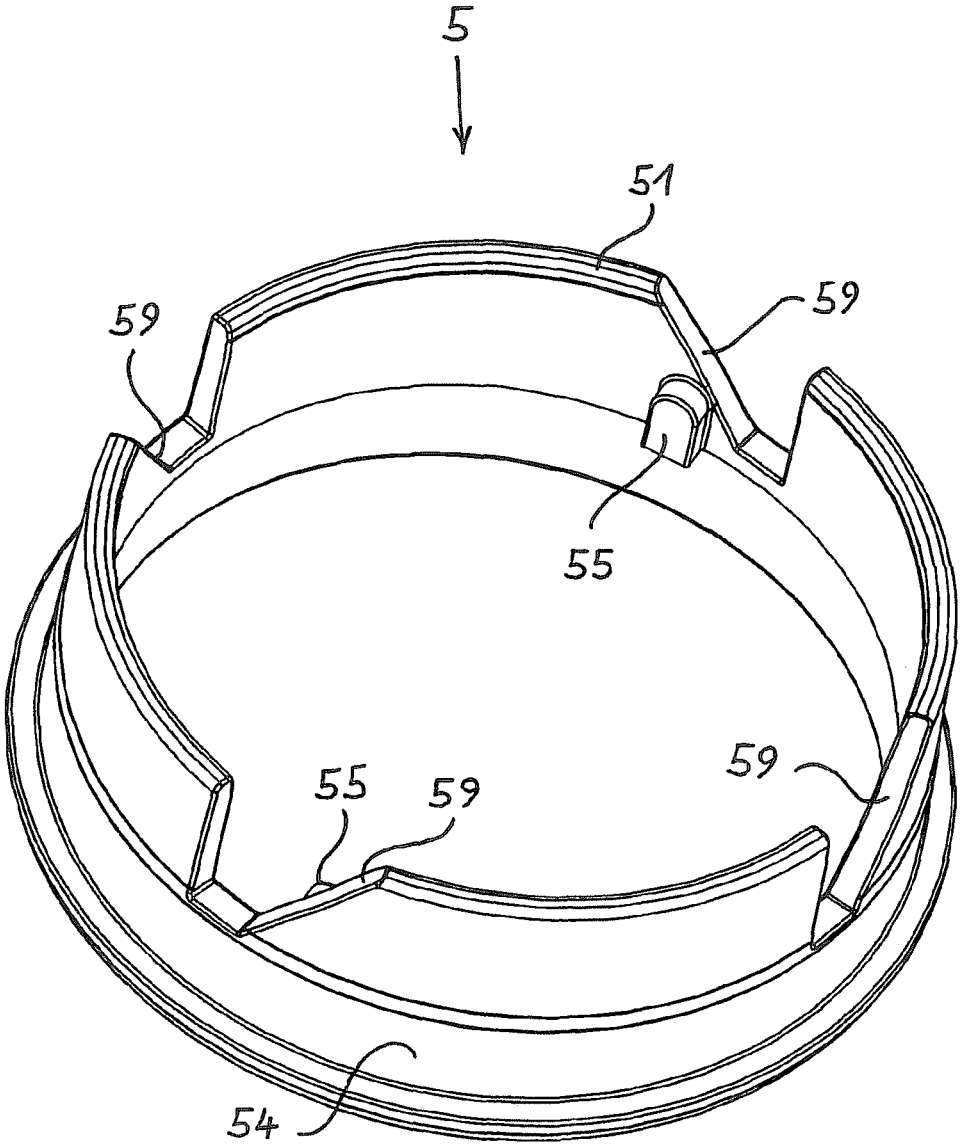
FIG. 13 shows a locking ring, which can be displaceably connected to the stand pipe from FIG. 12, as component part in top view.

FIG. 13 shows a locking ring 5, which can be displaceably connected to the stand pipe 4 from FIG. 12, as component part in top view. The locking ring 5 has the basic shape of a low hollow cylinder and, radially on the outside, has the projecting spring support 54, on the bottom side of which the spring 44 is supported in the assembled state of the filter 1.

In FIG. 13, the circumferential upper edge 51 of the locking ring 5, into which a plurality, here a total of four, inclined planes 59 are integrally molded, faces the observer. These inclined planes 59 serve to interact with the above-mentioned inclined planes 39 on the filter insert 3. The two guide noses 55, which serve to interact with the guide contour 45 on the stand pipe 4, are integrally molded so as to project radially inwardly on the inner periphery of the locking ring 5, located opposite one another.

Figure 14:
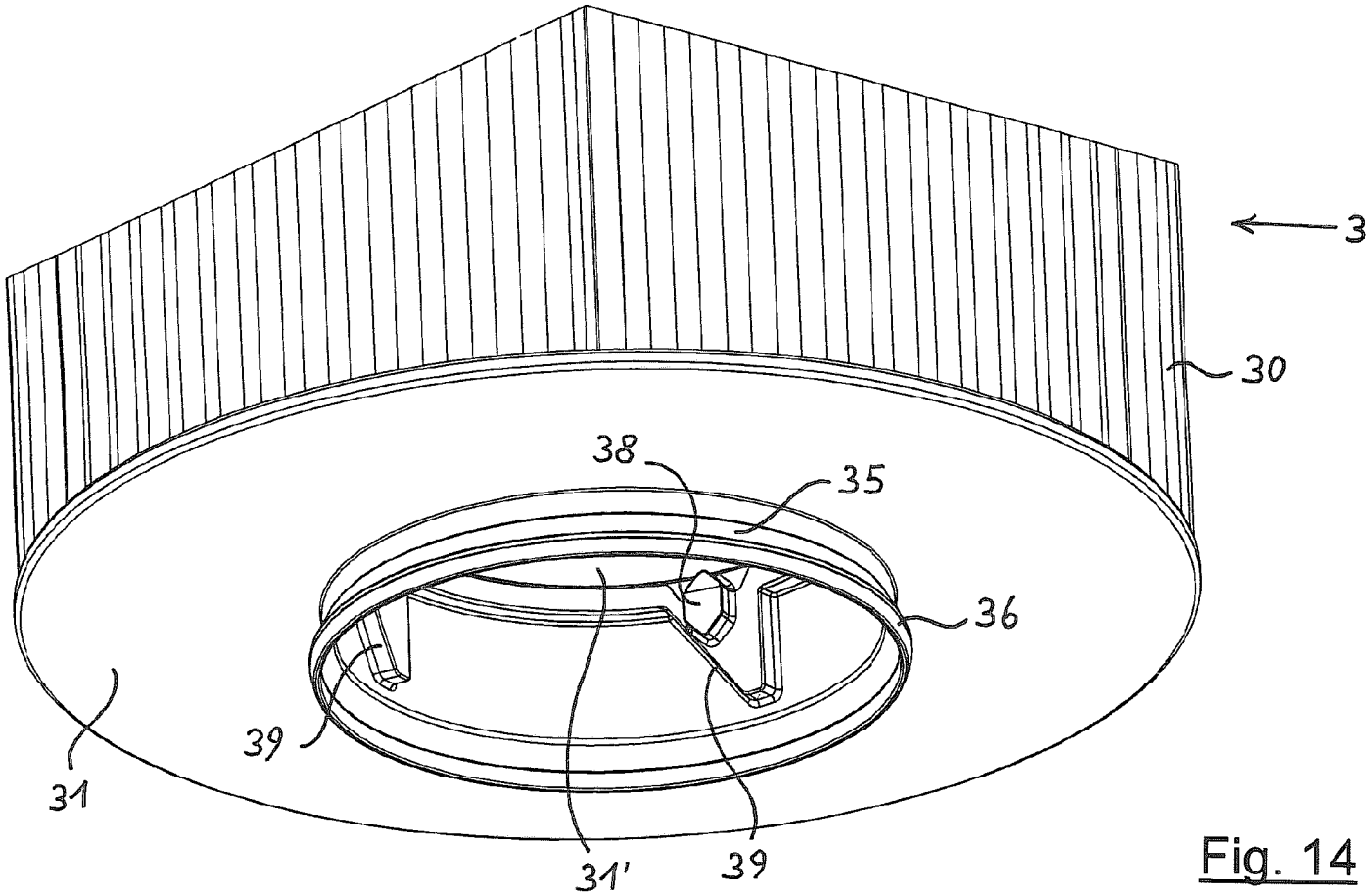
FIG. 14 shows the lower part of a filter insert, comprising integrated unlocking means, in top view.

FIG. 14 shows the lower part of a filter insert 3 in a view, transversely from the bottom. The lower end disc 31 closes the filter cloth body 30 on its lower end side. The through hole 31', which is surrounded by the annular appendage 35, is located in the center of the end disc 31. On its axially lower end, the appendage 35 supports the seal 36, which faces radially outwardly.

On the one hand, the position guide means 38, which serve to interact with the position guide means 48 on the stand pipe 4, and, on the other hand, the inclined planes 39, which serve to interact with the inclined planes 59 on the locking ring 5, are located on the inner periphery of the appendage 35.

FIGS. 15 to 24 show the filter 1 in a third embodiment, for which it is characteristic that the filter housing 2 additionally encompasses a discharge channel 27, which is arranged in an eccentric position on the bottom 25 of the housing 2. The discharge channel 27 serves the purpose of releasing a path for draining liquid from the filter housing 2 when the filter insert 3 is pulled out, so that a filter insert 3, which is free from liquid as much as possible, can be removed from the filter housing 2. It is necessary thereby that the discharge channel 27 is closed during the operation of the filter 1.

Figure 15:
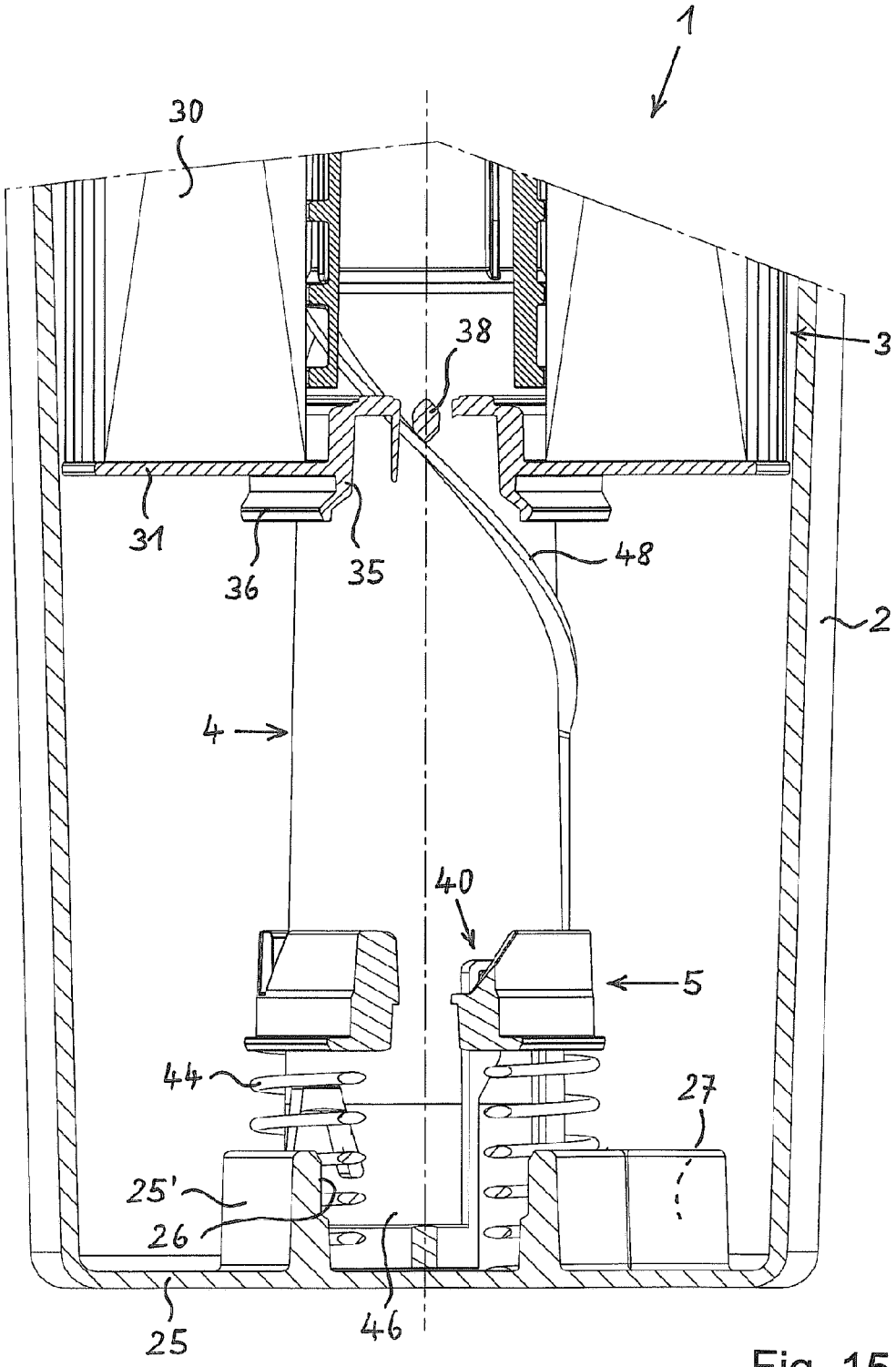
FIG. 15 shows the filter in a third embodiment in a longitudinal section through the lower area of the filter, comprising a partially inserted filter insert, in longitudinal section.

FIG. 15 shows the filter 1 in the third embodiment in a longitudinal section through the lower area of the filter 1, comprising an only partially inserted filter insert 3 in longitudinal section. The cup-shaped filter housing 2 with the bottom 25 and the hollow-cylindrical bottom part 25' thereof again forms the outer limitation of the filter insert 1. A stand pipe 4, which is connected on its lower end 46 to the filter housing 2, is again arranged centrally in the filter housing 2.

The locking ring 5, which, just as the corresponding locking device 40, corresponds to the above-described exemplary embodiment, is again arranged on the lower part of the stand pipe 4. The spring 44, which is also embodied as a pressure spring here, is again located below the locking ring 5.

In the upper part of FIG. 15, the lower part of the filter insert 3 can be seen at the onset of its insertion into the filter housing 2. Here, the filter insert 3 also has a filter cloth body 30, the lower end side of which is covered by the end dise 31. The annular appendage 35 with the seal 36, which faces radially outwardly, extends concentrically from the end disc 31.

On the outer periphery of the stand pipe 4, the position guide means 48 runs in the form of a coil, which initially runs transversely, viewed from top to bottom, and which then merges into an axial course further below. The position guide means 38, which is present on the filter insert 3, interacts with the position guide means 48, in that the position guide means 38 glides along the position guide means 48. Due to the coil shape of the upper part of the position guide means 48, the filter insert 3 is simultaneously twisted in peripheral direction in response to its downwards movement, which serves the purpose of bringing the filter insert 3 into a desired twist position relative to the filter housing 2 and to the discharge channel 27, before the filter insert 3 reaches its final installation position.

Figure 16:
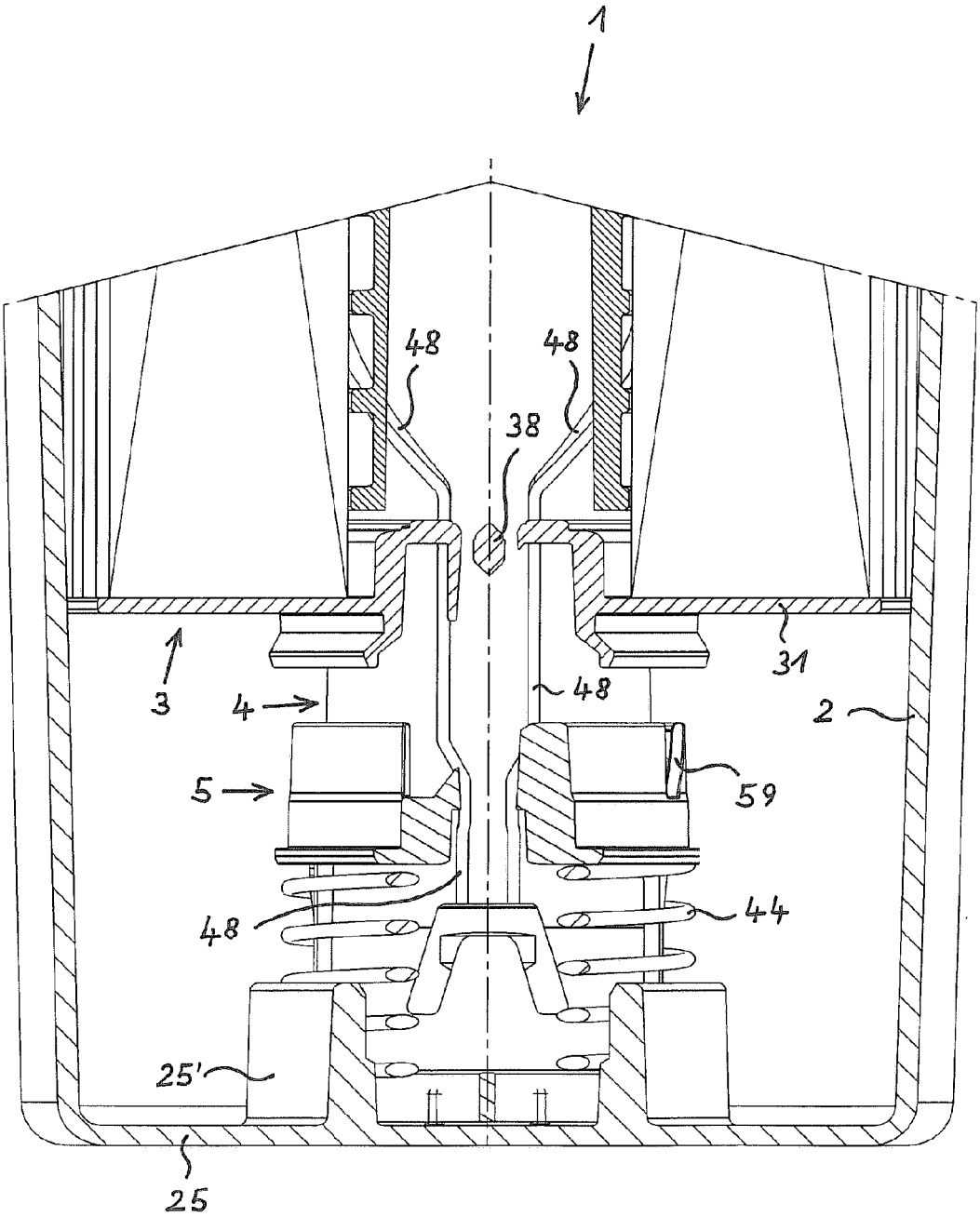
FIG. 16 shows the filter from FIG. 15, comprising a further inserted filter insert in longitudinal section.

FIG. 16 shows the filter 1 from FIG. 15 with a further inserted filter insert 3 in a further longitudinal section, which is twisted as compared to FIG. 15. The section now runs such that the position guide means 48, which are arranged on the outer periphery of the stand pipe 4, face the observer. The position guide means 38 of the filter insert 3 is located between the position guide means 48. The locking ring 5 is still in its pushed-out position, because the lower end disc 31 of the filter insert 3 is still spaced apart from the locking ring 5. On the outer periphery of the locking ring 5, one of its inclined planes 59 is visible, which interact with the inclines planes 39, which are not visible here, on the inner periphery of the end dise 31 when the filter insert 3 is further displaced downwards.

Figure 17:
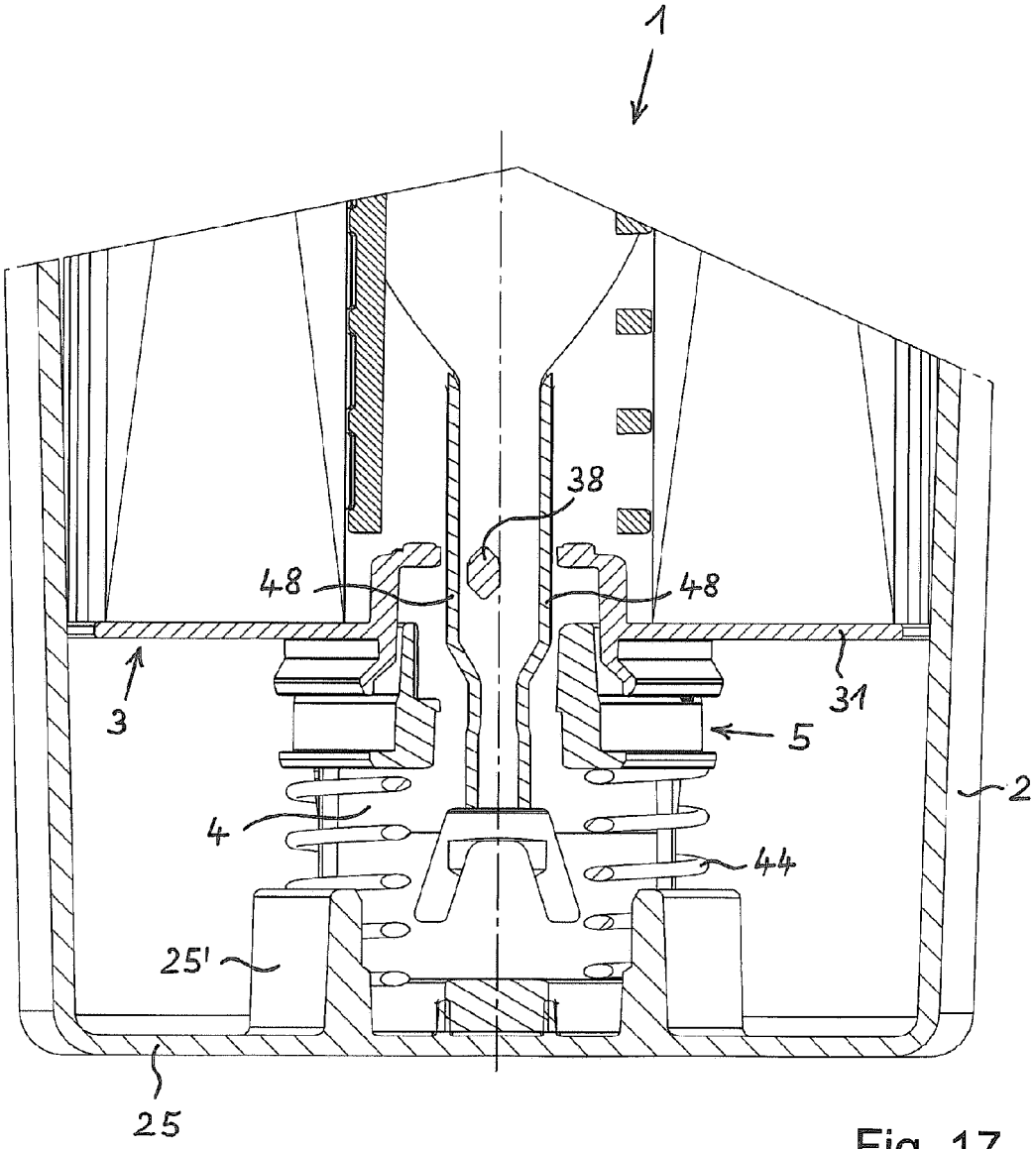
FIG. 17 shows the filter from FIGS. 15 and 16, comprising an even further inserted filter insert, in longitudinal section.

FIG. 17 shows the filter 1 from FIGS. 15 and 16, comprising an even further inserted filter insert 3, again in longitudinal section, comprising a sectional plane, which is parallel to the sectional plane of FIG. 16. With its lower end disc 31, the filter insert 3 is now just about to be in contact with the locking ring 5, which is still also in its pushed-out position. The position guide means 38, which is present on the filter insert 3, is located between the axially running sections of the position guide means 48, the distance of which is reduced towards the bottom, so as to effect the final positioning of the filter insert 3.

FIG. 18 once again illustrates the filter 1 from FIGS. 15 to 17, comprising a once again even further inserted filter insert 3, again illustrated in longitudinal section, wherein the section is now placed such that the guide contour 45 on the outer periphery of the stand pipe 4 faces the observer and that the section goes through the discharge channel 27. The filter insert 3 is now displaced downwards on the stand pipe 4 to the extent the lower end disc 31 has come into engagement with the locking ring 5. By means of the interacting inclined planes 39 and 59, which are not visible in FIG. 18, the locking device 40 is unlocked by a certain twisting of the locking ring 5 relative to the stand pipe 4. In this unlocked state, the guide nose 55 of the locking ring 5 is located offset in peripheral direction to the locked stage 45' of the guide contour 45. The lock is thus released and filter insert 3 can be moved further downwards, together with the locking ring 5, with which it is engaged, against the force of the spring 44, wherein this downwards movement is also preferably carried out here by screwing a cover 21 onto the filter housing 2.

Figure 18:
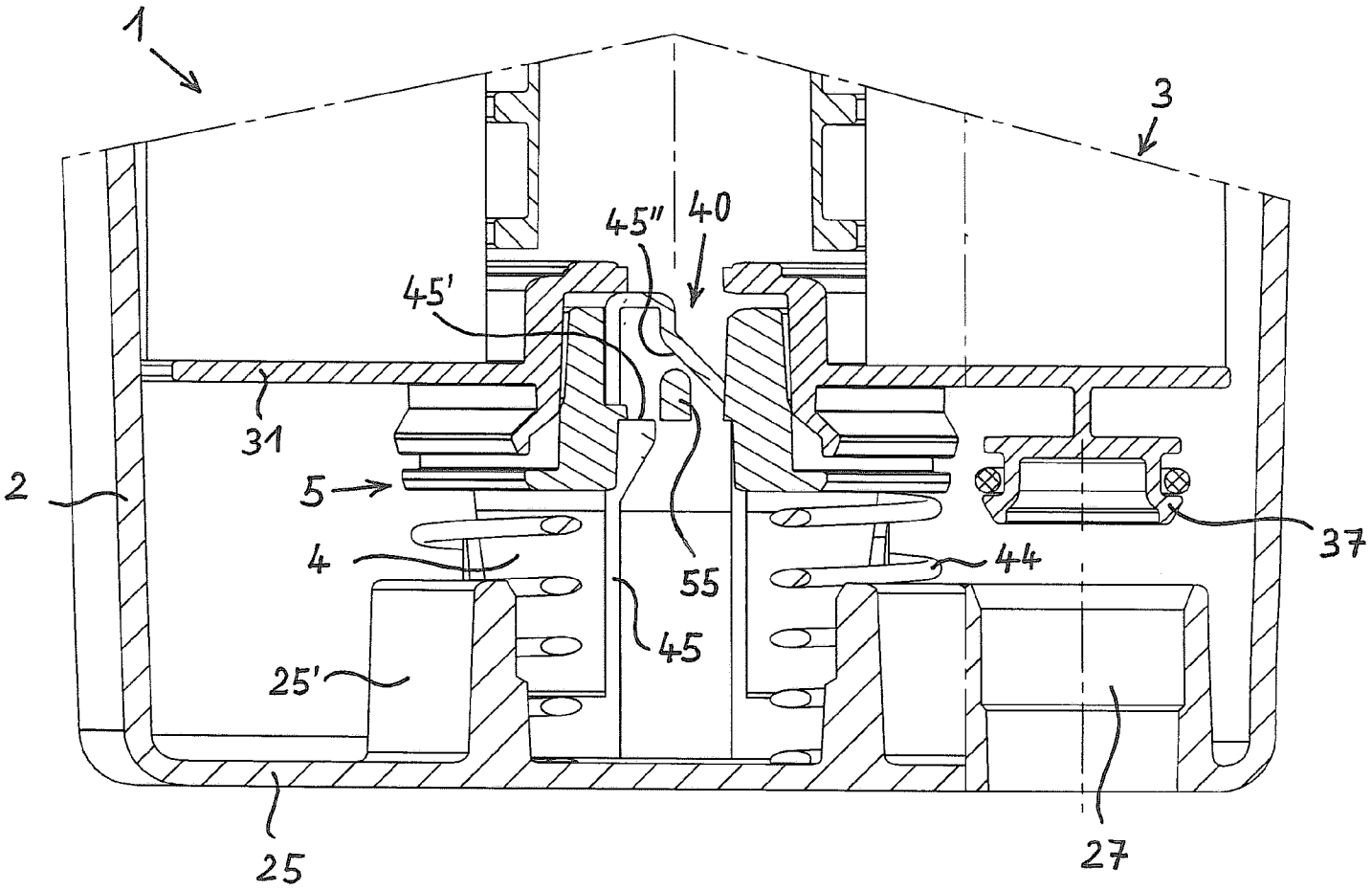
FIG. 18 shows the filter from FIGS. 15 to 17, comprising a once again even further inserted filter insert, in longitudinal section.

On the bottom side of the end disc 31, the locking bolt 37, which is embodied integrally molded with the latter, and which has now reached its engagement-suitable position to the discharge channel 27 by means of the guiding by means of the position guide means 38 and 48, is visible to the right in FIG. 18. A twisting of the filter insert 3 by means of the locking bolt 37 relative to the discharge channel 27 is now no longer possible due to the guiding of the filter insert 3 by means of the position guide means 38 and 48, which are not visible in FIG. 18.

Figure 19:
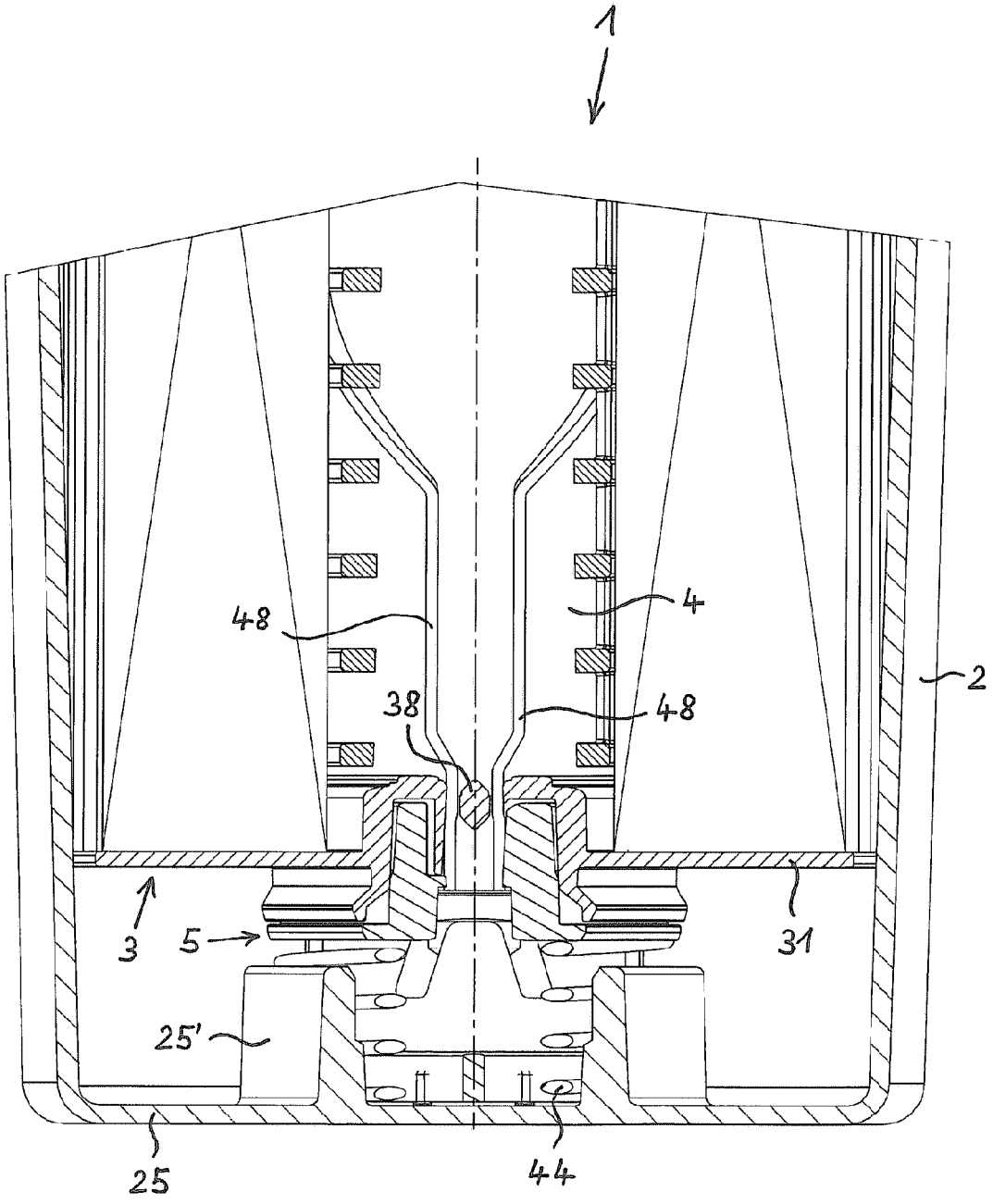
FIG. 19 shows the filter from FIGS. 15 to 18, comprising a once again even further inserted filter insert, in longitudinal section.

FIG. 19 shows the filter 1 from FIGS. 15 to 18, comprising a once again even further inserted filter insert 3, in a longitudinal section, which is placed such that the position guide means 48 on the outer periphery of the stand pipe 4 now again face the observer. By further axially displacing the filter insert 3 downwards, the position guide means 38 thereof has now reached into that area of the position guide means 48, in which they run with a smaller distance in axial direction, viewed in peripheral direction. The distance between the position guide means 48 is thereby so small that the position guide means 38 of the filter insert 3, which is guided therein, has just enough room to move. At the same time, the locking ring 5 is displaced further downwards against the force of the spring 4 by means of the filter insert 3, which was moved further downwards, on the stand pipe 4.

Figure 20:
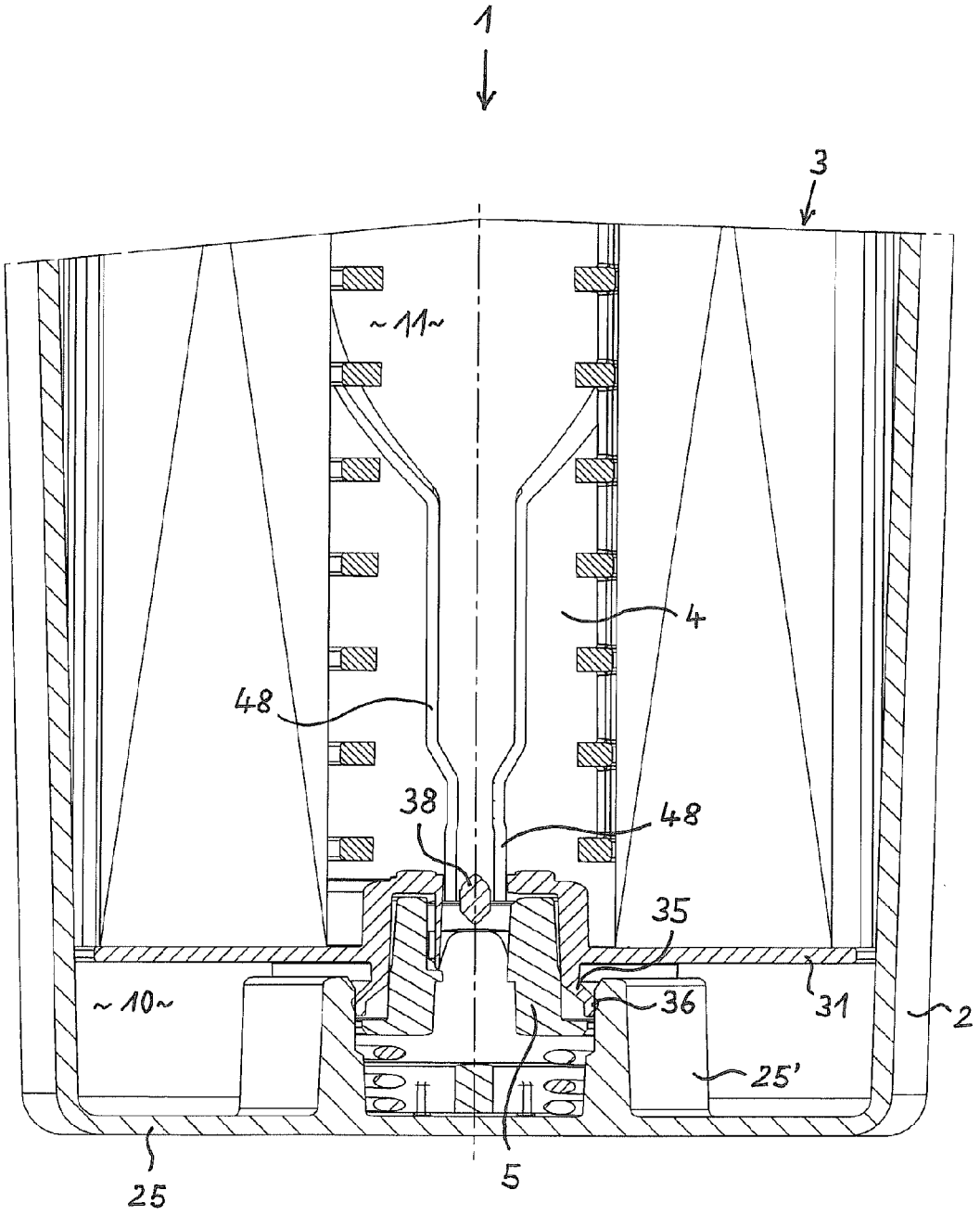
FIG. 20 shows the filter from FIGS. 15 to 19, comprising a completely inserted filter insert, in a first longitudinal section.

FIG. 20 now shows the filter 1 form FIGS. 15 to 19, comprising a completely inserted filter insert 3, in a further longitudinal section, which is located in the sectional plane of FIG. 19. The locking ring 5 now engages with the hollow-cylindrical bottom part 24', and the annular appendage 35 engages with the sealing ring 36. The position guide means 38 of the filter insert 3 is now located on the lower end of the position guide means 48. The filter 1 is thus now ready for operation after the cover 21 has been attached.

Figure 21:
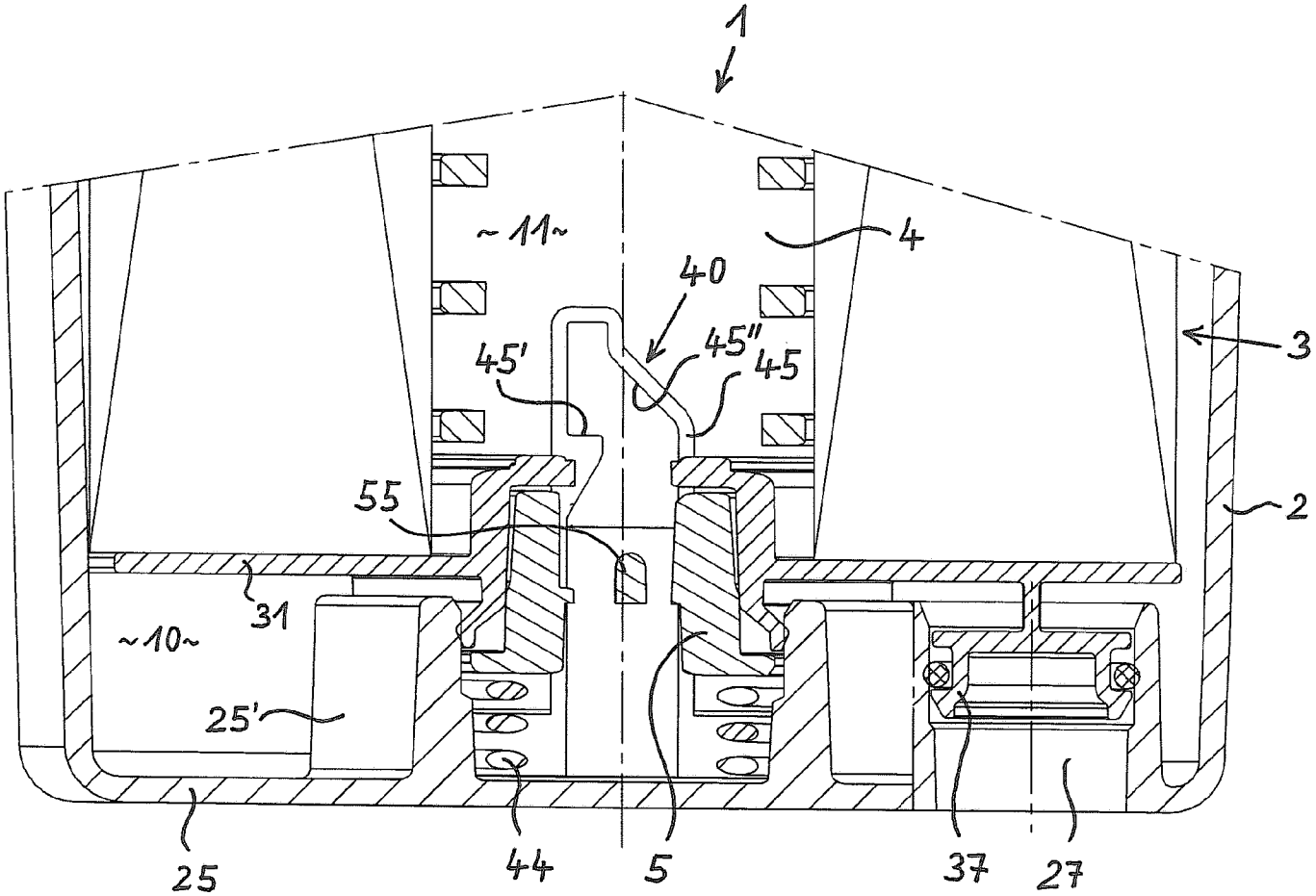
FIG. 21 shows the filter from FIG. 20 in a second longitudinal section.

FIG. 21 shows the filter 1 from FIG. 20 in a second longitudinal section, rotated by 90°. Here, the view is again onto the area of the outer periphery of the stand pipe 4 comprising the locking device 40 and the corresponding guide contour 45. The guide nose 55 of the locking ring 5 is now located offset in peripheral direction and in axial direction to the locking stage 45', which is synonymous with the unlocked position of the locking device 40. The locking bolt 37 now rests tightly in the upper en area of the discharge channel 27, whereby liquid can no longer flow out of the interior of the filter housing 2 into the discharge channel 27.

Figure 22:
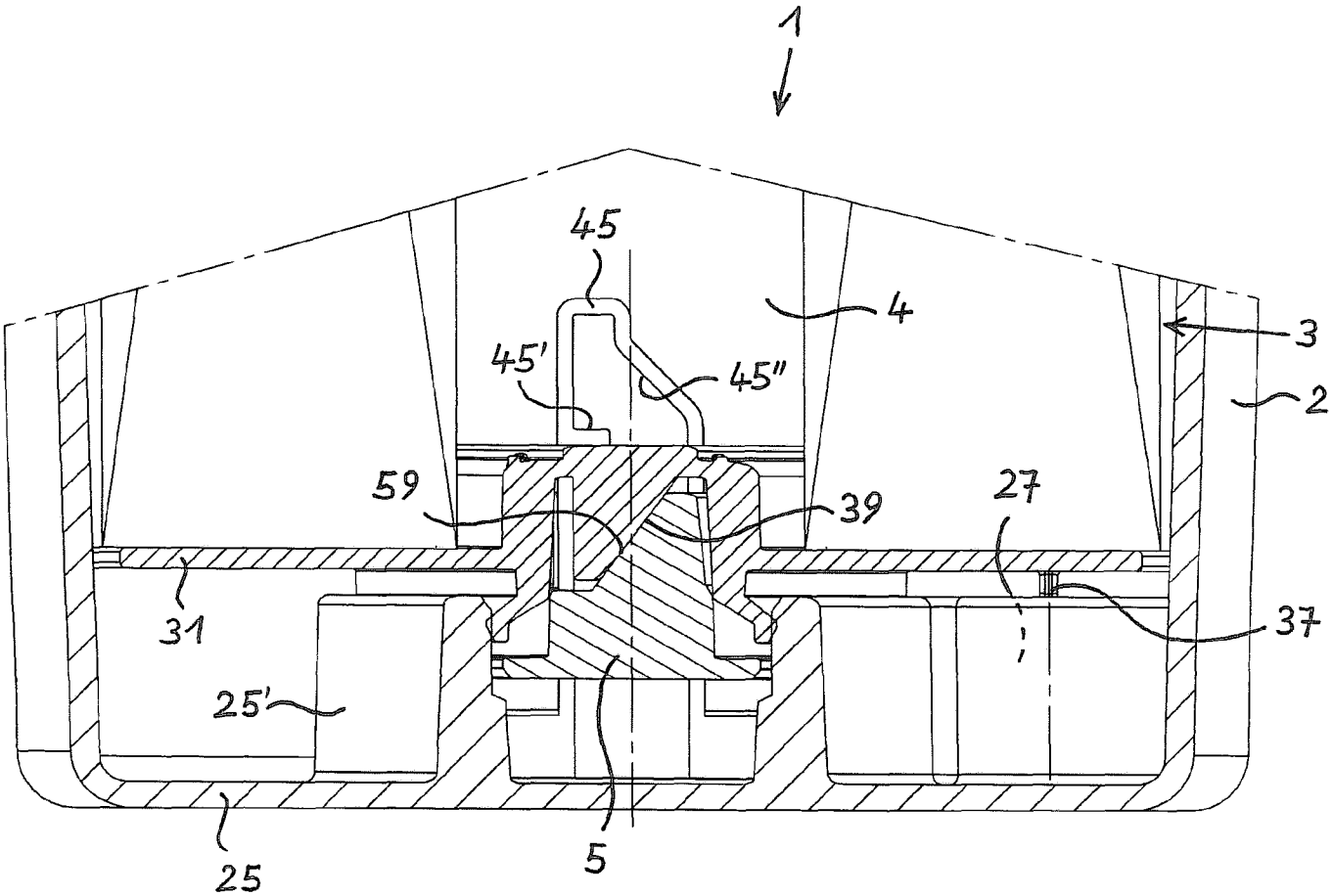
FIG. 22 shows the filter from FIGS. 20 and 21 in a third longitudinal section.

In FIG. 22, the filter 1 from FIGS. 20 and 21 is illustrated in a third longitudinal section, which is offset parallel to the front relative to the previous longitudinal section, so that the sectional plane now in each case runs through one of the inclined planes 39 and 59 on the filter insert 3 and on the locking ring 5. The inclined planes 39 and 59 are now completely engaged with one another, which means that the filter insert 3, which is now inserted completely into the housing 2, has twisted the locking ring 5 by a certain angle in peripheral direction, which is sufficient for unlocking the locking device 40, by means of its axial movement. The discharge channel 27 comprising the locking bolt 37, which rests tightly against it, is now located on the bottom right in FIG. 22, behind the sectional plane.

Figure 23:
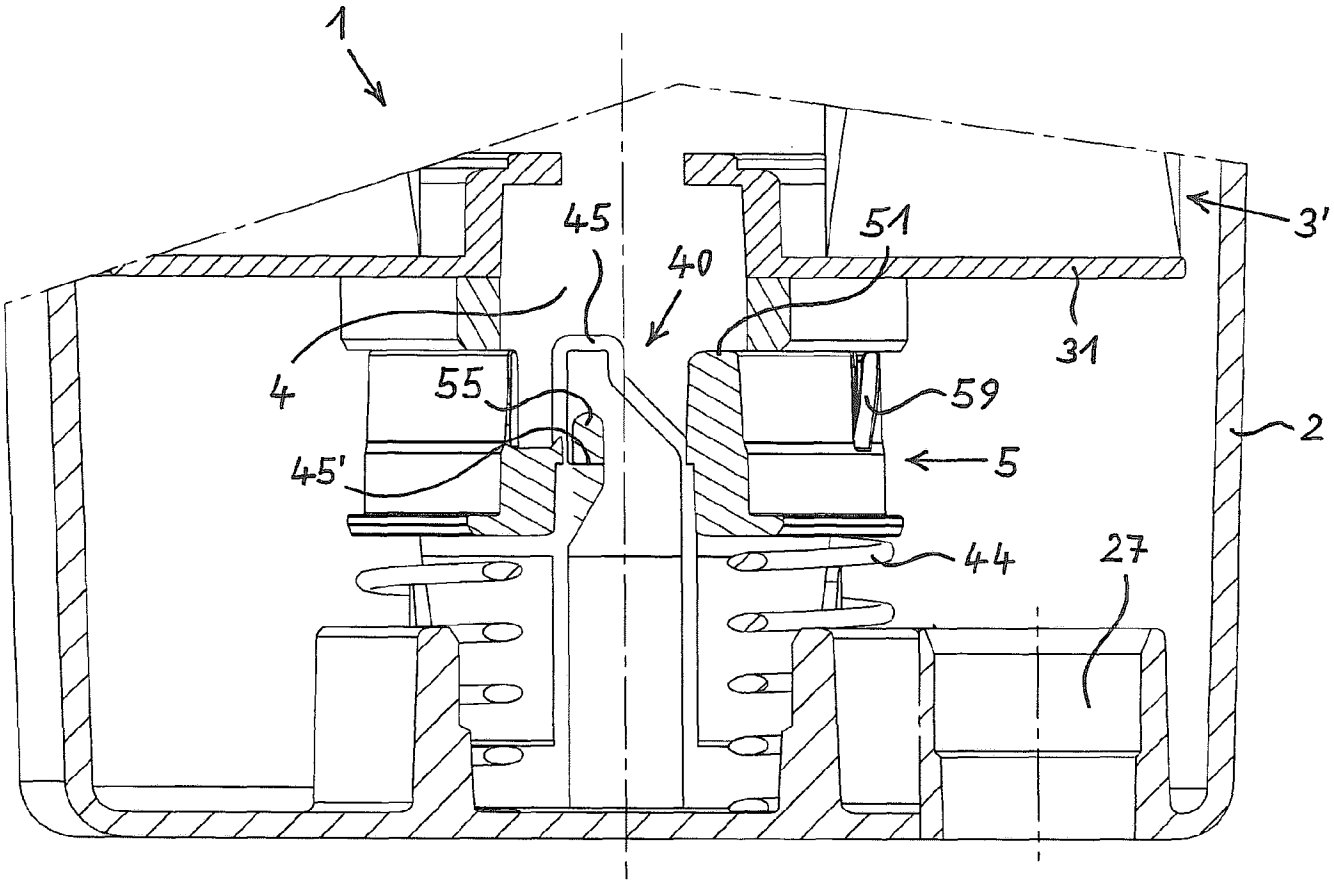
FIG. 23 shows the filter from FIGS. 15 to 22, comprising an unsuitable third-party filter insert, in longitudinal section.

FIG. 23 shows the filter 1 from FIGS. 15 to 22, comprising an unsuitable third-party filter insert 3' in a longitudinal section, which is located such that the outer periphery of the stand pipe 4 comprising the locking device 40 faces the observer. Here, the third-party filter insert 3' presses the locking ring 5 beyond the upper edge 51 thereof I downwards in axial direction with its lower end dise 31, but a further downwards movement is locked, because the guide nose 55 of the locking ring 5 impacts the locked stage 45' of the guide contour 45 after a short movement path, because the third-party filter insert 3' illustrated herein does not have the means, which are required for unlocking the locking device 40, in particular not the necessary inclined planes 39. A force, which is oriented in peripheral direction, thus does not act on the inclined planes 59 of the locking ring 5 here, which has the result that the locking ring 5 maintains its locked position, Due to the fact that the third-party filter insert 3' cannot be inserted completely into the housing 2, a separation between untreated medium side and clean medium side is also not attained and the cover of the housing 2 cannot be attached. Finally, the locking pin for the discharge channel 37 is also missing in the case of the third-party filter insert 3', so that the filter 1 cannot be made ready for operation by means of said third-party filter insert 3'.

Figure 24:
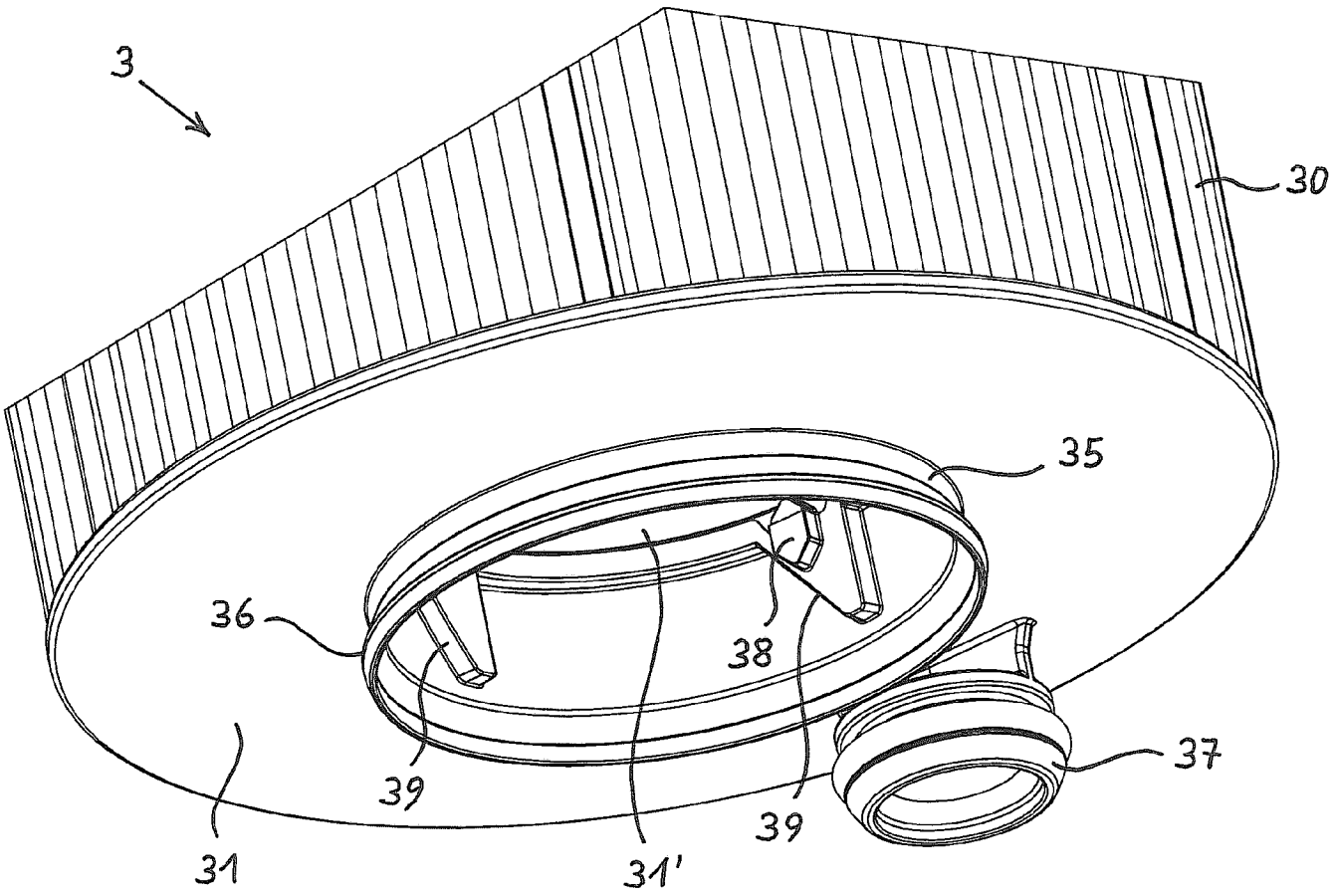
FIG. 24 shows a filter insert, which matches the filter according to FIGS. 15 to 22, in top view, transversely from the bottom.

Finally, FIG. 24 shows a filter insert 3, which matches the filter 1 according to FIGS. 15 to 22, in top view transversely from the bottom, wherein only the lower part of the filter insert 3 is illustrated here. It can be seen that the filter cloth body 30 is covered on the bottom by the lower end dise 31, which is moreover embodied so as to be identical to the end disc 31 according to FIG. 14. In addition, the end dise 31 according to FIG. 24 has the eccentrically arranged locking bolt 37, which is embodied here so as to be integrally molded to the end disc 31. The sealing effect can be optimized by means of a separate sealing ring, consisting of an elastomer or rubber, which is attached to the locking bolt 37.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

List of Reference Numerals:

| Numeral | Description |
|---|---|
| 1 | filter |
| 10 | untreated medium side |
| 11 | clean medium side |
| 2 | filter housing |
| 21 | cover |
| 22 | thread |
| 23 | seal in 22 |
| 24 | snap-in pins on 21 |
| 25 | bottom of 2 |
| 25' | hollow-cylindrical bottom part |
| 26 | sealing surface in 25' |
| 27 | discharge channel |
| 28 | annular gap |
| 3 | filter insert |
| 3' | third-party filter insert |
| 30 | filter cloth body |
| 30 | support grid in 30 |
| 31 | first (lower) end disc |
| 31' | through hole in 31 |
| 32 | second (upper) end disc |
| 33 | unlocking means (ribs) |
| 34 | snap-in pins on 32 |
| 35 | annular appendage on 31 |
| 36 | seal on 35 |
| 37 | locking bolt for 27 |
| 38 | position guide means on 3 |
| 39 | inclined planes on 31 |
| 4 | stand pipe |
| 40 | locking device |
| 41 | locking guides |
| 41' | locking surface |
| 42 | liquid discharge channel in 4 |
| 43 | cams on 41 |
| 44 | spring |
| 44' | spring support |
| 45 | guide contour for 5 |
| 45' | locking stage |
| 45" | guide bevel |
| 46 | lower end of 4 |
| 48 | position guide means on 4 |
| 5 | locking ring |
| 51 | upper edge |
| 51' | lower edge |
| 54 | spring support |
| 55 | guide nose on 5 |
| 59 | inclined planes on 5 |

The invention claimed is:

1. A filter for a fluid medium, comprising a filter housing and a cover, which is releasably connectable to the filter housing, comprising a replaceable filter insert, which comprises a hollow-cylindrical filter cloth body and two end discs, [enclosing] the hollow-cylindrical filter cloth body [frontally] *enclosing a space between the two end discs*, a first end disc *of the two end discs* encompassing a central through hole, wherein, leading with the first end disc, the filter insert can be plugged onto a central stand pipe, which forms part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, *the locking device comprising two resilient locking guides which are integrally molded to the central stand pipe and each having a locking surface pointing upwards located directly below a lower edge of the locking ring,* wherein provision is made for unlocking means, which are guided by the filter insert and which, when the filter insert is pushed onto the stand pipe, actuate the locking device in an unlocking direction and enable the locking ring and the filter insert to be pushed in, and wherein, when the filter insert is fitted into the filter housing, a seal provided on [one of] the first end disc [and on the locking ring] interacts with a sealing surface of the filter housing to separate an untreated medium side from a clean medium side of the filter, comprising:

when the locking ring is in the pushed-out position and when the filter insert is in axial contact with the locking ring, the seal provided on [one of] the first end disc of the filter insert [and on the locking ring] is held at an axial distance from the corresponding sealing surface of the filter housing in the pushed-out direction and is held in [the] *a* a non-sealing position at a distance from the sealing surface by means of the locking device and the sealing surface and the seal interact so as to form a seal when the [one of the and the locking ring] filter insert carrying the seal is in the pushed-in position when the locking device is unlocked.

2. [The filter according to claim 1.] *A filter for a fluid medium, comprising a filter housing and a cover, which is releasably connectable to the filter housing, comprising a replaceable filter insert, which comprises a hollow-cylindrical filter cloth body and two end discs, the hollow-cylindrical filter cloth body enclosing a space between the two end discs, a first end disc of the two end discs encompassing a central through hole, wherein, leading with the first end disc, the filter insert can be plugged onto a central stand pipe. which forms part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, wherein provision is made for unlocking means, which are guided by the filter insert and which, when the filter insert is pushed onto the stand pipe, actuate the locking device in an unlocking direction and enable the locking ring and the filter insert to be pushed in, and wherein. when the filter insert is fitted into the filter housing, a seal provided on the first end disc interacts with a sealing surface of the filter housing to separate an untreated medium side from a clean medium side of the filter, comprising:*

*when the locking ring is in the pushed-out position and when the filter insert is in axial contact with the locking ring, the seal provided on the first end disc of the filter insert is held at an axial distance from the corresponding sealing surface of the filter housing in the pushed-out direction and is held in a non-sealing position at a distance from the sealing surface by means of the locking device and*

*the sealing surface and the seal interact so as to form a seal when the filter insert carrying the seal is in the pushed-in position when the locking device is unlocked,* wherein the filter housing has a bottom comprising a central, hollow-cylindrical bottom part and the sealing surface on [the] *a* filter housing side is arranged on [one of] an inner peripheral surface[, an outer peripheral surface and an end surface] of the hollow-cylindrical bottom part.

3. The filter according to claim 2, wherein the hollow-cylindrical bottom part and a lower part of the stand pipe define an annular gap, which accommodates the locking ring in the pushed-in position thereof at least across a part of a height of the locking ring.

4. The filter according to claim 2, wherein the first end disc of the filter insert, which encompasses the through hole, encompasses a central annular appendage, which surrounds the through hole and which supports the seal, on a side of the first end disc, which faces away from the filter cloth body.

5. The filter according to claim 4, wherein the hollow-cylindrical bottom part and a lower part of the stand pipe define an annular gap, which accommodates the locking ring in the pushed-in position thereof at least across a part of a height of the locking ring and the appendage engages with the annular gap by means of the seal when the filter insert is fitted in the filter housing.

6. The filter according to claim 1, wherein the unlocking means are [one of arranged and] integrally molded on [one of the filter insert and a separate unlocking means body which can be plugged onto the stand pipe before] the filter insert.

7. The filter according to claim 6, wherein the unlocking means are one of arranged and integrally molded on the first end disc of the filter insert, which encompasses the through hole, or on a support body, which forms part of the filter insert and which is arranged in the interior of the filter cloth body between the end dises.

8. The filter according to claim 1, wherein the locking device is formed by means of *the two resilient* locking guides, which are embodied so as to be one of integrally molded with and fixedly connected to the stand pipe, being movable in radial direction, the locking guides each comprising a locking surface which is oriented in axial direction, wherein the locking guides are prestressed with a force which acts in a locking direction and which locks the locking ring in its pushed-out position against an axial insertion relative to the stand pipe by means of its locking surface, the locking guides being directly movable in a radial direction into the unlocked position thereof by means of the unlocking means when the filter insert is plugged onto the stand pipe.

9. The filter according to claim 8, wherein the locking guides run in an axial direction.

10. The filter according to claim 8, wherein the locking guides comprise a resilient material.

11. The filter according to claim 8, wherein the locking ring is hollow-cylindrical and is attached to the stand pipe on the outside and wherein the locking guides are provided on the stand pipe and each encompass a locking nose which is oriented radially outwardly, wherein the locking noses can be engaged with and disengaged from an end side of the locking ring.

12. The filter according to claim 8, wherein the locking guides each encompass a cam which radially protrudes in the locking direction and wherein the unlocking means engage with the cams when the filter insert is plugged onto the stand pipe and the locking guides pivot radially in the unlocking direction.

13. The liquid filter according to claim 8, wherein a stop, which defines the movement thereof in the locking direction, is assigned to each locking guide.

14. The filter according to claim 8, wherein the unlocking means are formed by ribs which protrude radially in the unlocking direction of the locking guides.

15. [The filter according to claim 1,] *A filter for a fluid medium, comprising a filter housing and a cover, which is releasably connectable to the filter housing, comprising a replaceable filter insert, which comprises a hollow-cylindrical filter cloth body and two end discs, the hollow-cylindrical filter cloth body enclosing a space between the two end discs, a first end disc of the two end discs encompassing a central through hole, wherein. leading with the first end disc, the filter insert can be plugged onto a central stand pipe, which forms part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, wherein provision is made for unlocking means, which are guided by the filter insert and which, when the filter insert is pushed onto the stand pipe, actuate the locking device in an unlocking direction and enable the locking ring and the filter insert to be pushed in. and wherein, when the filter insert is fitted into the filter housing, a seal provided on the first end disc interacts with a sealing surface of the filter housing to separate an untreated medium side from a clean medium side of the filter, comprising:*

*when the locking ring is in the pushed-out position and when the filter insert is in axial contact with the locking ring, the seal provided on the first end disc of the filter insert is held at an axial distance from the corresponding sealing surface of the filter housing in the pushed-out direction and is held in a non-sealing position at a distance from the sealing surface by means of the locking device and*

*the sealing surface and the seal interact so as to form a seal when the filter insert carrying the seal is in the pushed-in position when the locking device is unlocked,* wherein the locking device is formed by means of guide means, which are arranged on the outer periphery of the stand pipe and on the inner periphery of the locking ring, which together form a locking stage and an axial or transverse guide, which is offset thereto in peripheral direction, wherein the guide means lock the locking ring in its pushed-out position against an axial insertion relative to the stand pipe by means of the locking stage and wherein the locking ring is twistable into an unlocked position in a peripheral direction by means of the unlocking means when the filter insert is plugged onto the stand pipe and can then be inserted along the axial or transverse guide.

16. The filter according to claim 15, wherein at least one interacting inclined plane is arranged on the inner periphery of the filter insert and on the outer periphery of the locking ring such that the locking ring is set into a limited rotation in response to an axial displacement of the filter insert.

17. The filter according to claim 16, wherein the at least one inclined plane on the filter insert side is arranged on the inner periphery of the central through hole of the first end disc.

18. The filter according to claim 15, wherein the guide means, which are arranged on the outer periphery of the stand pipe, are formed by at least one protruding web, which forms a guide contour, and wherein the guide means, which are arranged on the inner periphery of the locking ring, are formed by means of at least one guide nose, which protrudes into the guide contour.

19. The filter according to claim 18, wherein the guide means, which are arranged on the outer periphery of the stand pipe, encompass a guide bevel which positively guides the locking ring into its locked position in response to its push-out movement.

20. The filter according to claim 1, wherein provision is made on the outer periphery of the stand pipe for *first* position guide means, which interact with one of the unlocking means and *second* guide means, which are additionally arranged on the inner periphery of the filter insert and which positively guide the unlocking means in peripheral direction into a position, which is suitable for engagement for the *two resilient* locking guides of the stand pipe or for [the] *a plurality of* inclined planes of the locking ring when the filter insert is plugged on, and which then lock the filter insert against being twisted in a peripheral direction.

21. The filter according to claim 1, wherein the force, which prestresses the locking ring in the pushed-out direction, is created by means of at least one pressure spring which is arranged on the outside of the stand pipe and which is supported at one end on the stand pipe or on the filter housing and on the other end on the locking ring.

22. The filter according to claim 1, wherein, for forming a coded lock-key system, provision is made for locking devices which are designed differently from one another, and for unlocking means which are designed differently from one another, for forming a coded lock-key system, wherein a certain embodiment of the locking device can only be unlocked by means of a certain, matching embodiment of the unlocking means.

23. The filter according to claim 1, wherein one of the end dises of the filter insert encompasses a valve seat for a valve body on the filter housing side, which is prestressed with a force acting in a valve closing direction, for forming a filter bypass valve.

24. [The filter according to claim 1,] *A filter for a fluid medium, comprising a filter housing and a cover, which is releasably connectable to the filter housing, comprising a replaceable filter insert, which comprises a hollow-cylindrical filter cloth body and two end discs, the hollow-cylindrical filter cloth body enclosing a space between the two end discs, a first end disc of the two end discs encompassing a central through hole, wherein, leading with the first end disc, the filter insert can be plugged onto a central stand pipe, which forms part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, wherein provision is made for unlocking means, which are guided by the filter insert and which, when the filter insert is pushed onto the stand pipe, actuate the locking device in an unlocking direction and enable the locking ring and the filter insert to be pushed in, and wherein, when the filter insert is fitted into the filter housing, a seal provided on the first end disc interacts with a sealing surface of the filter housing to separate an untreated medium side from a clean medium side of the filter, comprising:*

*when the locking ring is in the pushed-out position and when the filter insert is in axial contact with the locking ring, the seal provided on the first end disc of the filter insert is held at an axial distance from the corresponding sealing surface of the filter housing in the pushed-out direction and is held in a non-sealing position at a distance from the sealing surface by means of the locking device and*

*the sealing surface and the seal interact so as to form a seal when the filter insert carrying the seal is in the pushed-in position when the locking device is unlocked,* wherein the filter housing encompasses an eccentrically arranged discharge channel in its bottom, wherein the filter insert encompasses an axially protruding, eccentric locking bolt for the discharge channel on the side of the end disc facing the bottom, which faces away from the filter cloth body, and wherein provision is made for position guide means which interact on the inner periphery of the filter insert and on the outer periphery of the stand pipe and which positively guide the filter insert in peripheral direction into a position of the locking bolt, which is suitable for engagement for the discharge channel, when the filter insert is plugged onto the stand pipe.

25. A *replaceable* filter insert, which interacts with a filter [according to claim 1] *for a fluid medium, the filter comprising a filter housing and a cover, which is releasably connectable to the filter housing, a central stand pipe forming a part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, and wherein, when the filter insert is fitted into the filter housing, a seal provided on a first end disc interacts with a sealing surface of the filter housing to separate an untreated medium side from a clean medium side of the filter, when the locking ring is in the pushed-out position and when the filter insert is in axial contact with the locking ring, the seal provided on the first end disc of the filter insert is held at an axial distance from the corresponding sealing surface of the filter housing in the pushed-out direction and is held in a non-sealing position at a distance from the sealing surface by means of the locking device and the sealing surface and the seal interact so as to form a seal when the filter insert carrying the seal is in the pushed-in position when the locking device is unlocked*, wherein the filter insert comprises a hollow-cylindrical filter cloth body and two end discs, [enclosing the] hollow-cylindrical filter cloth body [frontally]*enclosing a space between the two end discs*, [the] *a* first end disc [of which encompasses] *of the two end discs encompassing a* [the] central through hole, wherein, leading with the first end disc, the filter insert can be plugged onto the central stand pipe, [which forms part of the filter housing of the filter,] wherein provision is made for [the] unlocking means, which are guided by the filter insert and which, when the filter insert is pushed onto the stand pipe, actuate [a] *the* locking device in [the] *an* unlocking direction and enable *the locking ring and* the filter insert to be pushed in completely, and wherein the unlocking means are [one of arranged and] integrally molded on the filter insert comprising:

guide means, which are additionally arranged on the filter insert, being provided for interacting with position guide means arranged on an outer *circumferential* periphery of the stand pipe, wherein, by means of the position guide means, the unlocking means can be positively guided in *a* peripheral direction into a position which is suitable for engagement for unlocking the locking device when the filter insert is plugged onto the stand pipe and the filter insert can than be locked against being twisted in *the* peripheral direction.

26. The filter insert according to claim 25, wherein, on the side facing away from the filter cloth body, the first end disc of the filter insert, which encompasses the through hole, encompasses a central annular appendage, which surrounds the through hole and which supports [a] *the* seal, which, when the filter insert is in the fitted state, separates an untreated medium side and a clean medium side of the filter from one another.

27. The filter insert according to claim 25, wherein the unlocking means are one of arranged and integrally molded on one of the first end disc of the filter insert and on a support body which forms part of the filter insert and which is arranged in the interior of the filter cloth body between the end discs.

28. [The filter insert according to claim 25,] *A replaceable filter insert, which interacts with a filter for a fluid medium, the filter comprising a filter housing and a cover, which is releasably connectable to the filter housing. a central stand pipe forming a part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, and wherein, when the filter insert is fitted into the filter housing, a seal provided on a first end disc interacts with a sealing surface of the filter housing to separate an untreated medium side from a clean medium side of the filter, when the locking ring is in the pushed-out position and when the filter insert is in axial contact with the locking ring, the seal provided on the first end disc of the filter insert is held at an axial distance from the corresponding sealing surface of the filter housing in the pushed-out direction and is held in a non-sealing position at a distance from the sealing surface by means of the locking device and the sealing surface and the seal interact so as to form a seal when the filter insert carrying the seal is in the pushed-in position when the locking device is unlocked,*

*wherein the filter insert comprises a hollow-cylindrical filter cloth body and two end discs, the hollow-cylindrical filter cloth body enclosing a space between the two end discs, a first end disc of the two end discs encompassing a central through hole, wherein, leading with the first end disc, the filter insert can be plugged onto the central stand pipe, wherein provision is made for unlocking means, which are guided by the filter insert and which, when the filter insert is pushed onto the stand pipe, actuate the locking device in an unlocking direction and enable the locking ring and the filter insert to be pushed in completely, and wherein the unlocking means are integrally molded on the filter insert, comprising:*

*guide means, which are additionally arranged on the filter insert, being provided for interacting with position guide means arranged on an outer circumferential periphery of the stand pipe, wherein, by means of the position guide means, the unlocking means can be positively guided in a peripheral direction into a position which is suitable for engagement for unlocking the locking device when the filter insert is plugged onto the stand pipe and the filter insert can then be*

*locked against being twisted in the peripheral direction,* wherein at least one inclined plane is arranged on an inner periphery of the filter insert for interacting with at least one inclined plane on an outer periphery of a locking ring, which forms part of the locking device such that the locking ring can be set into a limited unlocking rotation in response to an axial displacement of the filter insert.

29. The filter insert according to claim 28, wherein the at least one inclined plane on the filter insert side is arranged on the inner periphery of the central through hole of the first end disc.

30. The filter insert according to claim 25, wherein one of the end discs of the filter insert encompasses a valve seat for a valve body on the filter housing side, which is prestressed with a force acting in valve closing direction, for forming a filter bypass valve.

31. [The filter insert according to claim 25.] *A replaceable filter insert, which interacts with a filter for a fluid medium, the filter comprising a filter housing and a cover, which is releasably connectable to the filter housing, a central stand pipe forming a part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, and wherein, when the filter insert is fitted into the filter housing, a seal provided on a first end disc interacts with a sealing surface of the filter housing to separate an untreated medium side from a clean medium side of the filter, when the locking ring is in the pushed-out position and when the filter insert is in axial contact with the locking ring, the seal provided on the first end disc of the filter insert is held at an axial distance from the corresponding sealing surface of the filter housing in the pushed-out direction and is held in a non-sealing position at a distance from the sealing surface by means of the locking device and the sealing surface and the seal interact so as to form a seal when the filter insert carrying the seal is in the pushed-in position when the locking device is unlocked,*

*wherein the filter insert comprises a hollow-cylindrical filter cloth body and two end discs, the hollow-cylindrical filter cloth body enclosing a space between the two end discs, a first end disc of the two end discs encompassing a central through hole, wherein, leading with the first end disc, the filter insert can be plugged onto the central stand pipe, wherein provision is made for unlocking means, which are guided by the filter insert and which, when the filter insert is pushed onto the stand pipe, actuate the locking device in an unlocking direction and enable the locking ring and the filter insert to be pushed in completely, and wherein the unlocking means are integrally molded on the filter insert, comprising:*

*guide means, which are additionally arranged on the filter insert, being provided for interacting with position guide means arranged on an outer circumferential periphery of the stand pipe, wherein, by means of the position guide means, the unlocking means can be positively guided in a peripheral direction into a position which is suitable for engagement for unlocking the locking device when the filter insert is plugged onto the stand pipe and the filter insert can then be locked against being twisted in the peripheral direction,* wherein, on a side of the first end disc which faces away from the filter cloth body, the filter insert encompasses an axially protruding, eccentric locking bolt for a discharge channel, which is arranged eccentrically in the bottom of a corresponding filter housing, and wherein position guide means, which are provided on the inner periphery of the filter insert for interacting with the position guide means, which are arranged on the outer periphery of the stand pipe, are arranged such that the filter insert can be positively guided in peripheral direction into a position of the locking bolt, which is suitable for engagement for the discharge channel, when the filter insert is plugged onto the stand pipe.

*32. A replaceable filter insert, which interacts with a filter for a fluid medium, the filter comprising a filter housing and a cover, which is releasably connectable to the filter housing, a central stand pipe forming a part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, and wherein, when the filter insert is fitted into the filter housing, a seal provided on a first end disc interacts with a sealing surface of the filter housing to separate an untreated medium side from a clean medium side of the filter, when the locking ring is in the pushed-out position and when the filter insert is in axial contact with the locking ring, the seal provided on the first end disc of the filter insert is held at an axial distance from the corresponding sealing surface of the filter housing in the pushed-out direction and is held in a non-sealing position at a distance from the sealing surface by means of the locking device and the sealing surface and the seal interact so as to form a seal when the filter insert carrying the seal is in the pushed-in position when the locking device is unlocked,*

*wherein the filter insert comprises a hollow-cylindrical filter cloth body and two end discs, the hollow-cylindrical filter cloth body enclosing a space between the two end discs, a first end disc of the two end discs encompassing a central through hole, wherein, leading with the first end disc, the filter insert can be plugged onto the central stand pipe, herein provision is made for unlocking means, which are guided by the filter insert and which, when the filter insert is pushed onto the stand pipe, actuate the locking device in an unlocking direction and enable the locking ring and the filter insert to be pushed in completely, and wherein the unlocking means are integrally molded on the filter insert, comprising:*

*guide means, which are additionally arranged on the filter insert, being provided for interacting with position guide means arranged on an outer circumferential periphery of the stand pipe, wherein, by means of the position guide means, the unlocking means can be positively guided in a peripheral direction into a position which is suitable for engagement for unlocking the locking device when the filter insert is plugged onto the stand pipe and the filter insert can then be locked against being twisted in the peripheral direction, wherein the filter housing has a bottom comprising a central, hollow-cylindrical bottom part and the sealing surface on a filter housing side is arranged on an inner peripheral surface of the hollow-cylindrical bottom part; and*

*wherein the seal provided on the first end disc extends radially outward from a central axis of the filter insert.*

*33. A filter for a fluid medium, comprising a filter housing and a cover, which is releasably connectable to the filter housing, comprising a replaceable filter insert, which comprises a hollow-cylindrical filter cloth body and two end discs, the hollow-cylindrical filter cloth body enclosing a*

*space between the two end discs, a first end disc of the two end discs encompassing a central through hole, wherein, leading with the first end disc, the filter insert can be plugged onto a central stand pipe, which forms part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, wherein provision is made for unlocking means, which are guided by the filter insert and which, when the filter insert is pushed onto the stand pipe, actuate the locking device in an unlocking direction and enable the locking ring and the filter insert to be pushed in, and wherein, when the filter insert is fitted into the filter housing, a seal provided on the locking ring interacts with a sealing surface of the filter housing to separate an untreated medium side from a clean medium side of the filter, comprising:*

*when the locking ring is in the pushed-out position and when the filter insert is in axial contact with the locking ring, the seal provided on the locking ring is held at an axial distance from the corresponding sealing surface of the filter housing in the pushed-out direction and is held in a non-sealing position at a distance from the sealing surface by means of the locking device and*

*the sealing surface and the seal interact so as to form a seal when the locking ring carrying the seal is in the pushed-in position when the locking device is unlocked.*

*34. The filter according to claim 33, wherein the filter housing has a bottom comprising a central, hollow-cylindrical bottom part and the sealing surface on a filter housing side is arranged on an inner peripheral surface of the hollow-cylindrical bottom part.*

*35. The filter according to claim 33, wherein the unlocking means are integrally molded on the filter insert.*

*36. The filter according to claim 1, wherein the filter housing has a bottom comprising a central, hollow-cylindrical bottom part and the sealing surface on a filter housing side is arranged on an outer peripheral surface of the hollow-cylindrical bottom part.*

*37. The filter according to claim 1, wherein the unlocking means are arranged on a separate unlocking means body.*

*38. The filter according to claim 33, wherein the unlocking means are arranged on a separate unlocking means body.*

*39. A replaceable filter insert, which interacts with a filter for a fluid medium, the filter comprising a filter housing and a cover, which is releasably connectable to the filter housing, a central stand pipe forming a part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, and wherein, when the filter insert is fitted into the filter housing, a seal provided on the locking ring interacts with a sealing surface of the filter housing to separate an untreated medium side from a clean medium side of the filter, when the locking ring is in the pushed-out position and when the filter insert is in axial contact with the locking ring, the seal provided on the locking ring is held at an axial contact with the locking ring, the seal provided on the locking ring is held at an axial distance from the corresponding sealing surface of the filter housing in the pushed-out direction and is held in a non-sealing position at a distance from the sealing surface by means of the locking device and the sealing surface and the seal interact so as to form a seal when the locking ring carrying the seal is in the pushed-in position when the locking device is unlocked,*

*wherein the filter insert comprises a hollow-cylindrical filter cloth body and two end discs, the hollow-cylindrical filter cloth body enclosing a space between the two end discs, a first end disc of the two end discs encompassing a central through hole, wherein, leading with the first end disc, the filter insert can be plugged onto the central stand pipe, wherein provision is made for unlocking means, which are guided by the filter insert and which, when the filter insert is pushed onto the stand pipe, actuate the locking device in an unlocking direction and enable the locking ring and the filter insert to be pushed in completely, and wherein the unlocking means are integrally molded on the filter insert, comprising:*

*guide means, which are additionally arranged on the filter insert, being provided for interacting with position guide means arranged on an outer periphery of the stand pipe, wherein, by means of the position guide means, the unlocking means can be positively guided in a peripheral direction into a position which is suitable for engagement for unlocking the locking device when the filter insert is plugged onto the stand pipe and the filter insert can then be locked against being twisted in the peripheral direction.*

*40. The filter insert according to claim 39, wherein the filter housing has a bottom comprising a central, hollow-cylindrical bottom part and the sealing surface on a filter housing side is arranged on an inner peripheral surface of the hollow-cylindrical bottom part; and*

*wherein the seal provided on the locking ring extends radially outward from a central axis of the filter insert.*

*41. The filter according to claim 25, wherein the filter housing has a bottom comprising a central, hollow-cylindrical bottom part and the sealing surface on a filter housing side is arranged on an outer peripheral surface of the hollow-cylindrical bottom part; and*

*wherein the seal provided on the first end disc extends radially inward towards a central axis of the filter insert.*

*42. A replaceable filter insert, which interacts with a filter for a fluid medium, the filter comprising a filter housing and a cover, which is releasably connectable to the filter housing, a central stand pipe forming a part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, and wherein, when the filter insert is fitted into the filter housing, a seal provided on a first end disc interacts with a sealing surface of the filter housing to separate an untreated medium side from a clean medium side of the filter, when the locking ring is in the pushed-out position and when the filter insert is in axial contact with the locking ring, the seal provided on the first end disc of the filter insert is held at an axial distance from the corresponding sealing surface of the filter housing in the pushed-out direction and is held in a non-sealing position at a distance from the sealing surface by means of the locking device and the sealing surface and the seal interact so as to form a seal when the filter insert carrying the seal is in the pushed-in position when the locking device is unlocked,*

*wherein the filter insert comprises a hollow-cylindrical filter cloth body and two end discs, the hollow-cylindrical filter cloth body enclosing a space between the two end discs, a first end disc of the two end discs encompassing a central through hole, wherein, leading with the first end disc, the filter insert can be plugged onto the central stand pipe, wherein provision is made for unlocking means, which are guided by the filter insert and which, when the filter insert is pushed onto the stand pipe, actuate the locking device in an unlocking direction and enable the locking ring and the filter insert to be pushed in completely, and wherein the unlocking means are arranged on a separate unlocking means body, comprising:*

*guide means, which are additionally arranged on the filter insert, being provided for interacting with position guide means arranged on an outer periphery of the stand pipe, wherein, by means of the position guide means, the unlocking means can be positively guided in a peripheral direction into a position which is suitable for engagement for unlocking the locking device when the filter insert is plugged onto the stand pipe and the filter insert can then be locked against being twisted in the peripheral direction.*

*43. A replaceable filter insert, which interacts with a filter for a fluid medium, the filter comprising a filter housing and a cover, which is releasably connectable to the filter housing, a central stand pipe forming a part of the filter housing, wherein a locking ring is guided in an axially displaceable manner on the stand pipe, wherein the locking ring is preloaded by a force acting in a pushed-out direction pointing towards a free end of the stand pipe, wherein, in a pushed-out position, the locking ring is locked by a locking device against being pushed in, and wherein, when the filter insert is fitted into the filter housing, a seal provided on the locking ring interacts with a sealing surface of the filter housing to separate an untreated medium side from a clean medium side of the filter, when the locking ring is in the pushed-out position and when the filter insert is in axial contact with the locking ring, the seal provided on the locking ring is held at an axial distance from the corresponding sealing surface of the filter housing in the pushed-out direction and is held in a non-sealing position at a distance from the sealing surface by means of the locking device and the sealing surface and the seal interact so as to form a seal when the locking ring carrying the seal is in the pushed-in position when the locking device is unlocked,*

*wherein the filter insert comprises a hollow-cylindrical filter cloth body and two end discs, the hollow-cylindrical filter cloth body enclosing a space between the two end discs, a first end disc of the two end discs encompassing a central through hole, wherein, leading with the first end disc, the filter insert can be plugged onto the central stand pipe, wherein provision is made for unlocking means, which are guided by the filter insert and which, when the filter insert is pushed onto the stand pipe, actuate the locking device in an unlocking direction and enable the locking ring and the filter insert to be pushed in completely, and wherein the unlocking means are arranged on a separate unlocking means body, comprising:*

*guide means, which are additionally arranged on the filter insert, being provided for interacting with position guide means arranged on an outer periphery of the stand pipe, wherein, by means of the position guide means, the unlocking means can be positively guided in a peripheral direction into a position which is suitable for engagement for unlocking the locking device when the filter insert is plugged onto the stand pipe and the filter insert can then be locked against being twisted in the peripheral direction.*

*44. The filter insert according to claim 42, wherein the filter housing has a bottom comprising a central, hollow-cylindrical bottom part and the sealing surface on a filter housing side is arranged on an inner peripheral surface of the hollow-cylindrical bottom part; and*

*wherein the seal provided on the first end disc extends radially outward from a central axis of the filter insert.*

*45. The filter according to claim 42, wherein the filter housing has a bottom comprising a central, hollow-cylindrical bottom part and the sealing surface on a filter housing side is arranged on an outer peripheral surface of the hollow-cylindrical bottom part; and*

*wherein the seal provided on the first end disc extends radially inward towards a central axis of the filter insert.*

*46. The filter insert according to claim 43, wherein the filter housing has a bottom comprising a central, hollow-cylindrical bottom part and the sealing surface on a filter housing side is arranged on an inner peripheral surface of the hollow-cylindrical bottom part; and*

*wherein the seal provided on the locking ring extends radially outward from a central axis of the filter insert.*

* * * * *